US012742393B2

(12) United States Patent
Mosiewicz

(10) Patent No.: US 12,742,393 B2
(45) Date of Patent: Sep. 22, 2026

(54) AIRFOIL AND FLUID-DYNAMIC SURFACE COMPRISING SUCH AIRFOIL

(71) Applicant: R.E.M. PATENTS S.R.L., Arona (IT)

(72) Inventor: Roberto Eduardo Mosiewicz, Arona (IT)

(73) Assignee: R.E.M. PATENTS S.R.L., Arona (IT)

( * ) Notice: Subject to any disclaimer, the term of this patent is extended or adjusted under 35 U.S.C. 154(b) by 0 days.

(21) Appl. No.: 18/858,084

(22) PCT Filed: Apr. 18, 2023

(86) PCT No.: PCT/IB2023/053946
§ 371 (c)(1),
(2) Date: Oct. 18, 2024

(87) PCT Pub. No.: WO2023/203475
PCT Pub. Date: Oct. 26, 2023

(65) Prior Publication Data

US 2025/0277453 A1 Sep. 4, 2025

(30) Foreign Application Priority Data

Apr. 20, 2022 (IT) ........................ 102022000007814

(51) Int. Cl.
*F01D 5/14* (2006.01)
*B64C 3/14* (2006.01)
(Continued)

(52) U.S. Cl.
CPC ........ *F01D 5/141* (2013.01); *F05D 2240/303* (2013.01); *F05D 2240/304* (2013.01)

(58) Field of Classification Search
CPC ..... B64C 11/18; B64C 3/14; B64C 2003/147; B64C 2003/146; B64C 27/467;
(Continued)

(56) References Cited

U.S. PATENT DOCUMENTS 3,323,597 A * 6/1967 Lougobardi .......... B64C 27/473 416/144
10,577,937 B2 * 3/2020 Wilson ...................... F01D 5/16
(Continued)

FOREIGN PATENT DOCUMENTS

EP 1043223 A2 10/2000
EP 1468908 A1 10/2004
EP 2567891 A1 3/2013

OTHER PUBLICATIONS

International Search Report issued Jul. 11, 2023, in corresponding International Application PCT/IB2023/053946, 4 pages.

*Primary Examiner* — Eric J Zamora Alvarez
(74) *Attorney, Agent, or Firm* — Maier & Maier, PLLC

(57) ABSTRACT

An airfoil including a front leading edge, a rear trailing edge, a mean line and a thickness. The airfoil further includes: a front portion in which the thickness increases from the leading edge backwards up to a maximum thickness, and a rear portion in which the thickness increases from the trailing edge forwards up to the maximum thickness. The airfoil further includes a central portion placed between the front portion and the rear portion, in which the thickness is constant and equal to the maximum thickness. The airfoil also includes at least one assembled front section and rear section. The front portion is defined by the front section and the rear portion is defined by the rear section. The embodiments further concern a fluid-dynamic surface including two airfoils and a method for defining such an airfoil.

14 Claims, 15 Drawing Sheets

(51) Int. Cl.
*B64C 3/28* (2006.01)
*B64C 11/18* (2006.01)
*B64C 27/473* (2006.01)
*F03D 1/06* (2006.01)

(58) Field of Classification Search
CPC ... B64C 27/473; B64C 2003/144; B64C 3/26; B64C 3/28; F01D 5/141; F01D 5/145; F01D 5/147; F03D 1/0633; F03D 3/061; F03D 1/0675; F04D 29/281; F04D 29/384; F04D 29/681; F05D 2220/36; F05D 2240/124; F05D 2240/306; F05D 2240/303; F05D 2240/304
See application file for complete search history.

(56) References Cited

U.S. PATENT DOCUMENTS

| | | | | |
|---|---|---|---|---|
| 11,261,734 | B2 * | 3/2022 | Baralon ................ | F04D 29/668 |
| 2019/0202503 | A1 | 7/2019 | Suk et al. | |
| 2020/0398968 | A1 | 12/2020 | Sjostedt et al. | |

* cited by examiner 40
te
t(ml)
$t_{max}$
cl
ml
le
42
44
46

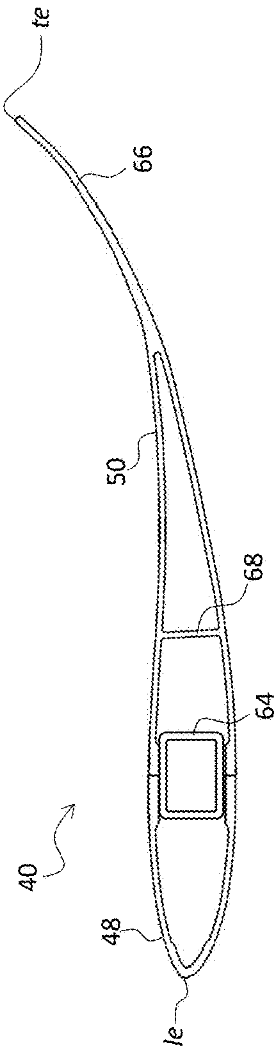
Fig. 11.a
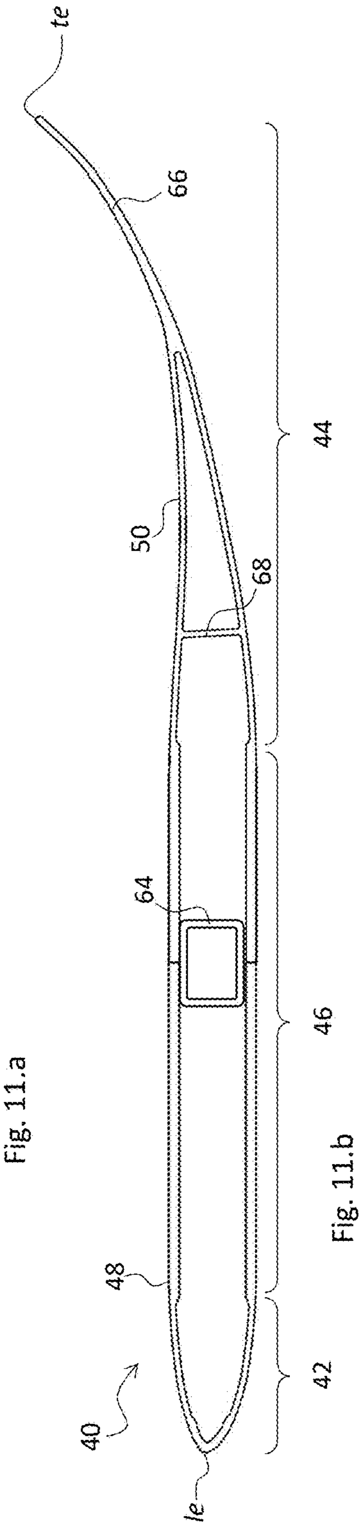
Fig. 11.b
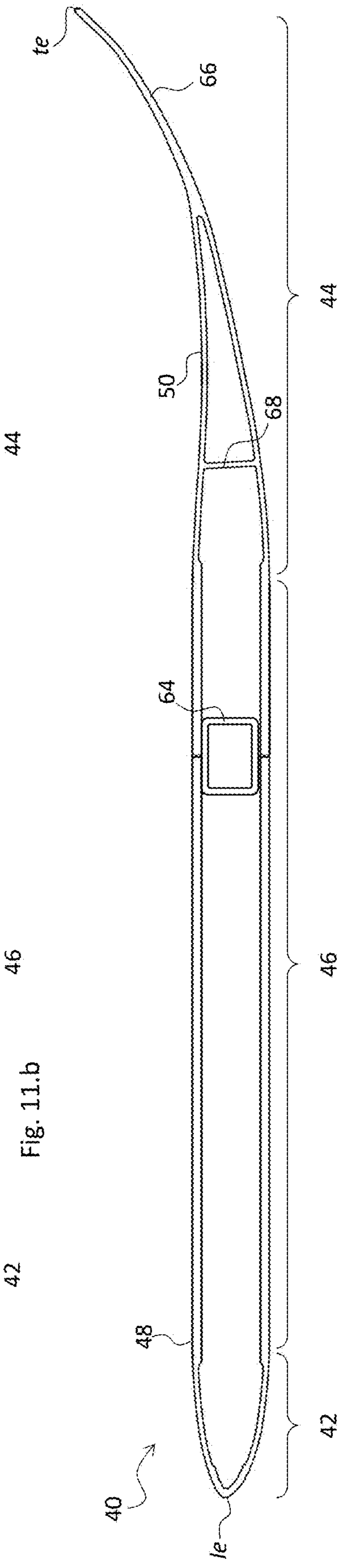
Fig. 11.c

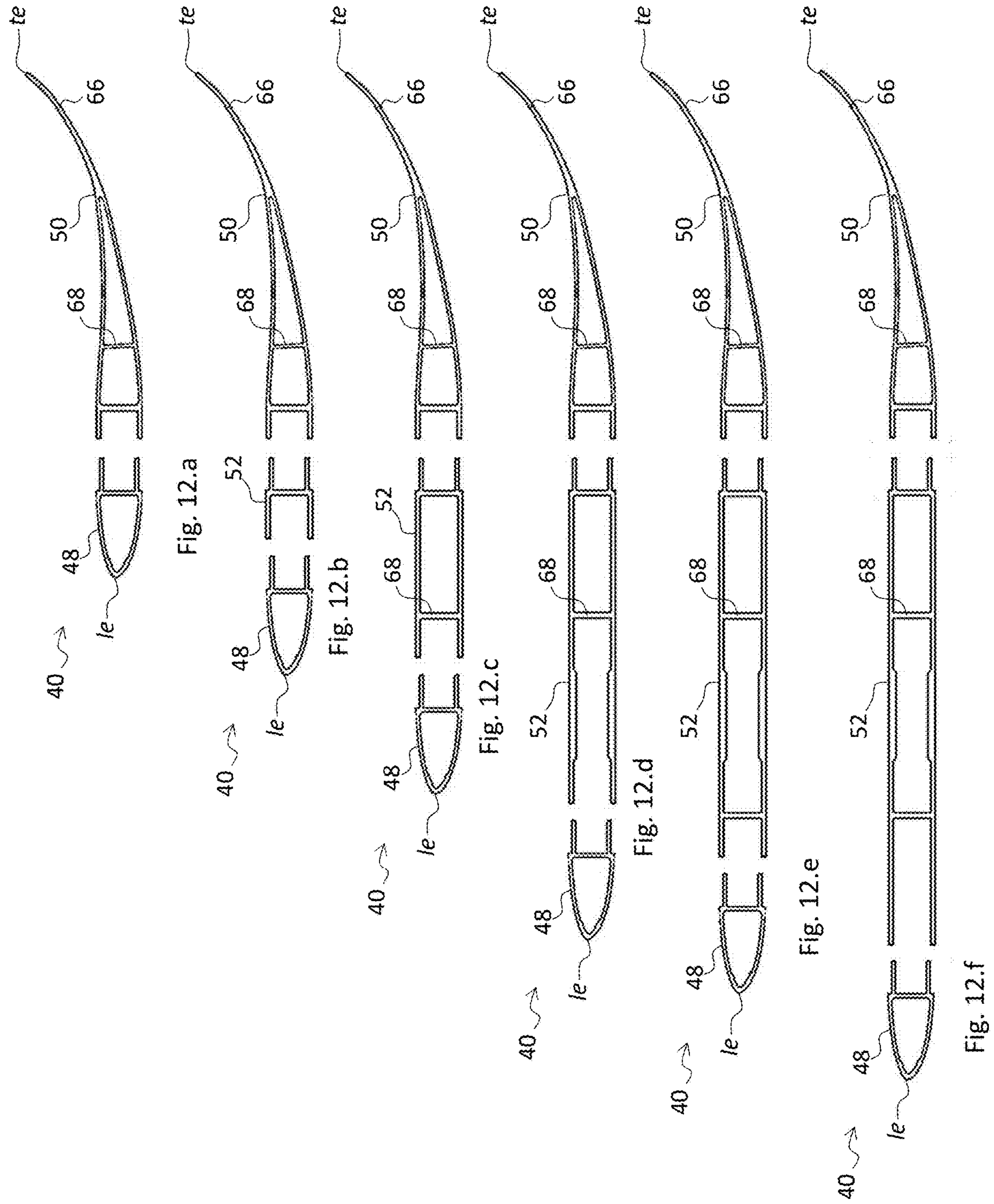
Fig. 12.a
Fig. 12.b
Fig. 12.c
Fig. 12.d
Fig. 12.e
Fig. 12.f

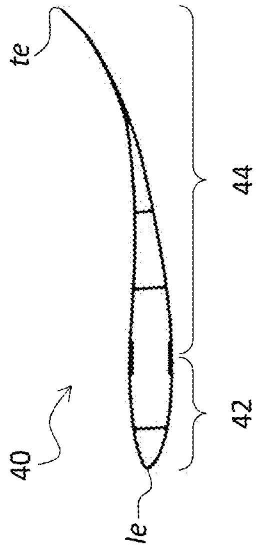
Fig. 36.a
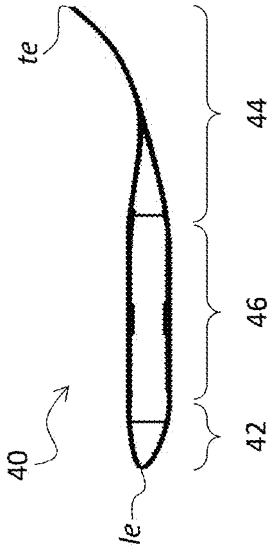
Fig. 36.b
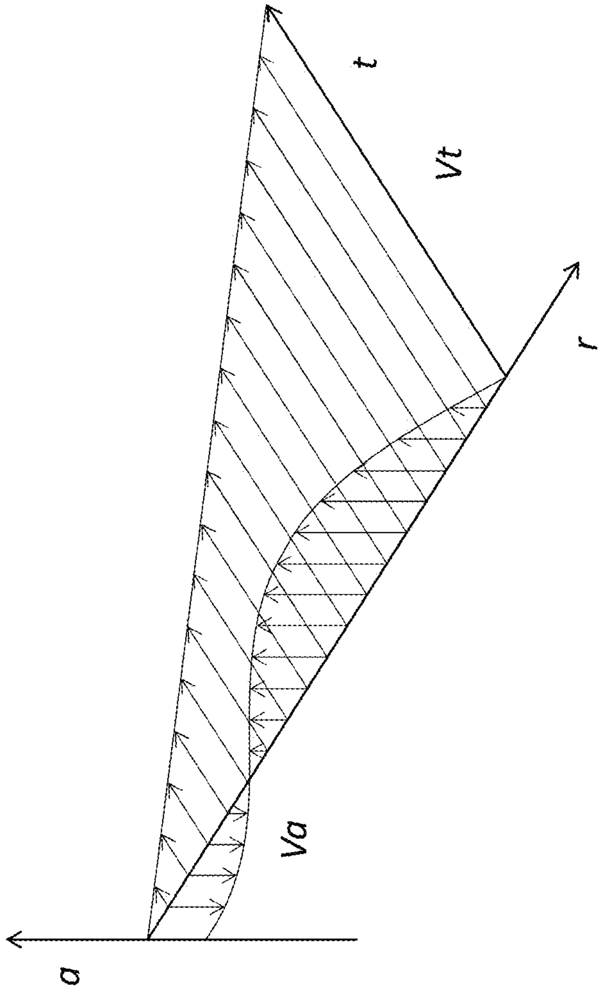
Fig. 35

AIRFOIL AND FLUID-DYNAMIC SURFACE COMPRISING SUCH AIRFOIL

TECHNICAL FIELD

The present invention refers to the sector of fluid-dynamic airfoils, in particular of the airfoils intended for the realization of fluid-dynamic surfaces, meaning thereby surfaces intended to interact with a fluid flow (of gas or of liquid) for the purpose of exchanging forces.

BACKGROUND

It is known that the performance of the fluid-dynamic surfaces depends to a large extent on their geometric characteristics, among which the shape of the airfoil adopted assumes particular importance.

Since the early decades of the twentieth century, much attention has been paid to the realization and the characterization of fluid-dynamic airfoils in order to optimize their performance in various operating conditions. By way of example, the scope of the aerodynamic airfoils and their use in the realization of aircraft wings is considered below. This is in fact one of the areas in which the study of fluid-dynamics has been explored more in-depth and which has led to considerable technological evolutions. However, the person skilled in the art can well understand how the same discussion can be directed to other areas of application of fluid-dynamics, such as for example the rotors, the turbomachines, the surfaces of civil buildings exposed to the wind and so on.

In a manner known per se, the characterization of the single airfoil 40 (for example the one shown in FIG. 1) takes place on the purely theoretical assumption of an infinite span wing, in order to cancel the end effects. This characterization is substantially independent of the absolute dimensions of the airfoil, for example of the actual measurement of the chord dl and of the thickness t, while it depends on other parameters such as the proportions among the measurements, the distribution of the thickness t, any curvature, etc.

In contrast, the characterization of the real wing depends very much on the geometric proportions, such as for example the aspect ratio (i.e. the ratio between the span and the mean chord), the tapering (i.e. the decrease of the chord from the root towards the end of the half-wing) and so on.

During the design of the wings (and of the fluid-dynamic surfaces more generally) it is therefore important to define not only the dimensionless geometry of the airfoil 40 to be adopted, but also the actual dimensions thereof. Therefore, the same identical airfoil is often adopted along the entire wing span, but it is scaled to adapt the chord to the needs imposed by the wing. This way of proceeding, widely spread and appreciated, is not without drawbacks.

In fact, this way of designing the wing is subject to some limits that in some situations may be too stringent. In particular, the reduction of the chord of the airfoil, for example towards the distal end of the half-wing, necessarily implies a proportional reduction in the thickness. In other words, the designer is forced to reduce the thickness of the wing in order to maintain the proportions of the airfoil. Alternatively, in fact, the designer should change the proportions of the airfoil ending up using an airfoil with unknown characteristics.

Furthermore, a wing in which both the chord cl and the thickness t of the airfoil vary defines a rather complex three-dimensional surface, the industrial manufacturing of which involves lengthy and expensive processes. Of course, in the manufacturing of the wings of an aircraft such costs do not represent a significant portion. Conversely, in the manufacturing of other types of devices, it would be useful to have much cheaper aerodynamic surface construction methods available.

Cheap construction methods are known, for example, in the manufacturing of the blades of the axial fans for industrial use. In this context, in fact, the industrial costs for production must be kept as low as possible. The blade 56 of an axial fan of known type is described below, with reference to the schematic representation in plan of FIG. 13, where the blade 56 is represented together with its hub 60. The blade 56 comprises a root structure 62 and a fluid-dynamic surface 54. While the fluid-dynamic surface 54 is intended to interact with the air flow, the root structure 62 performs the function, of an exclusively mechanical nature, of connecting the fluid-dynamic surface 54 to the hub 60 and of correctly transmitting the forces that are exchanged between these two elements.

There are different methods for manufacturing the blades 56 of the fans and in particular their fluid-dynamic surface 54. One of the most efficient methods is to obtain the fluid-dynamic surface 54 of the blade 56 by extrusion/pultrusion, for example with an airfoil 40 similar to the ones of FIGS. 4 and 5 (per se known).

Extrusion is an industrial process that consists essentially of forcing, by thrust, a ductile material to pass through a die that reproduces the external shape of the piece to be obtained. In this way it is possible to produce constant cross-section pieces having an indefinite a priori development along the extrusion direction (longitudinal direction ld). Extrusion can be used for metallic (especially aluminium, but also steel or titanium) and polymeric materials.

Pultrusion is an industrial process that essentially consists of forcing, by traction, the components of a composite material (fibres and matrix) to pass through a die that reproduces the external shape of the piece to be obtained. The fibres are fed continuously and are arranged mainly along the pultrusion direction, while the matrix polymerizes while passing through the die. In this way it is possible to produce constant cross-section pieces having an indefinite a priori development along the pultrusion direction (longitudinal direction ld). Pultrusion can be used for various types of composite materials (mainly fibreglass in epoxy matrix).

Both processes have a relatively low industrial cost. The typical dies used in both processes allow the production of pieces with potentially complex sections, where a very accurately finished external surface can be combined with a very rigid internal structure. In particular, with regard to the blades 56 of the fans, such airfoils comprise a dorsal wall and a ventral wall, between which one or more stiffening ribs 68 are arranged (see FIGS. 4 and 5).

However, the extrusion and pultrusion processes, although widely appreciated, are not without drawbacks.

A first drawback relates to the maximum possible dimensions for the extruded/pultruded products. The current technological limits mean that, in cross-section, the extruded/pultruded pieces can have a maximum dimension of about 50 cm. In the case of a monolithic airfoil 40, such as for example the one of FIG. 4, this limit imposes a maximum chord cl of less than 50 cm. This limit has been partially overcome with the airfoils 40 obtained in two sections 48, 50, such as for example the one of FIG. 5. In this way, in the face of a production complication, it is possible to have a chord cl greater than 50 cm, potentially almost 100 cm.

A second drawback relates to the fact that the products obtained by means of extrusion/pultrusion have by definition a constant cross-section along the longitudinal direction ld. This characteristic implies a considerable limitation to the possibilities of use of these products in the fluid-dynamic field. In fact, in many fluid-dynamic applications optimizing the performance of a fluid-dynamic surface 54 would require varying the cross-section along the main development direction of the surface itself, typically a variation of the chord cl.

In this regard, as part of the production of blades 56 for industrial axial fans, a technique called trim has been developed that allows to obtain a variation, albeit rather limited, of the cross-section of the extruded/pultruded airfoil 40. This technique adopts extruded/pultruded airfoils 40 of known type in which the dorsal wall and the ventral wall are joined in a single monolithic rear appendage 66 (see again FIGS. 4 and 5). This monolithic rear appendage 66 extends posteriorly, usually with a rather pronounced curvature, up to the trailing edge te. The trim, known per se, which allows to obtain an extruded/pultruded fluid-dynamic surface 54 having variable airfoil 40, is briefly described below with reference to FIGS. 13-16.

In FIG. 13, the fluid-dynamic surface 54 extends radially with constant cross-section, depicted in FIG. 15. In the solution of FIG. 14, use was instead made of the trim: the rear appendage 66 was progressively shortened in the radially outer region of the fluid-dynamic surface 54. Then in the radially inner region the fluid-dynamic surface 54 has a constant section, depicted in FIG. 15, which then reaches, by means of a gradual reduction of the rear appendage 66, up to the airfoil depicted in FIG. 16. The trim allows to obtain a greater aerodynamic efficiency because, along the blade 56, it progressively limits the angle of incidence and the curvature of the airfoils 40 in the radially outer region, where the fluid flow reaches the highest speeds.

The trim is currently the only technique that allows to modify to a limited extent the chord cl and the shape of an extruded/pultruded airfoil 40. As the person skilled in the art can well understand, however, such changes are only possible within very stringent limits. In particular, it is possible to reduce the chord cl of the airfoil 40 while it is not possible to increase it. In addition, the chord cl can be reduced only to the extent permitted by the extension of the monolithic rear appendage 66.

SUMMARY

An aim of the present invention is therefore that of at least partially overcoming the drawbacks highlighted above in relation to the prior art.

In particular, a task of the present invention is to provide an airfoil whose extension in the direction of the chord can be freely varied in a simple and economical way in order to adapt it to different needs.

Furthermore, a task of the present invention is to provide an airfoil which, despite the simplicity of manufacturing, maintains performances comparable to those of the known airfoils. Furthermore, a task of the present invention is to provide a fluid-dynamic surface whose proportions can be freely varied in a simple and economical way in order to adapt it to different needs.

Finally, a task of the present invention is to provide a method for defining in a simple and economical manner an airfoil having arbitrary chord in order to adapt it to different needs.

These and other objects and tasks of the present invention are achieved by an airfoil, a fluid-dynamic surface and a method in accordance with the appended claims. Further characteristics are identified in the dependent claims. All claims form an integral part of the present disclosure.

In accordance with a first aspect, the invention concerns an airfoil comprising a front leading edge le, a rear trailing edge te, a mean line ml and a thickness t. The profile further comprises:

- a front portion in which the thickness t increases, along the mean line ml from the leading edge le backwards, up to a maximum thickness $t_{max}$; and
- a rear portion in which the thickness t increases, along the mean line ml from the trailing edge te forwards, up to the maximum thickness $t_{max}$.

The airfoil of the invention further comprises a central portion, placed between the front portion and the rear portion, in which the thickness t is constant and equal to the maximum thickness $t_{max}$.

The airfoil comprises at least one front section and one rear section, assembled, wherein:

- the front portion is defined by the front section; and
- the rear portion is defined by the rear section.

The fact that the central portion has a constant thickness t, together with the fact that the airfoil is obtained by means of the assembly of two different sections, makes it easy to change the extension of the airfoil in the direction of the chord.

Preferably the front section and the rear section are obtained by means of extrusion/pultrusion.

The manufacturing of the sections by means of extrusion/pultrusion is particularly efficient in terms of the ratio between the quality of the pieces obtained and the industrial cost for production.

Preferably the central portion is defined by the front section and/or by the rear section.

In this way a relatively simple airfoil, consisting of only two sections, is obtained.

In some embodiments, the airfoil further comprises a central section. Preferably also the central section is obtained by means of extrusion/pultrusion.

The provision of a central section allows to increase the degrees of freedom in the definition of the airfoil, in particular it allows to increase the maximum possible extension in the direction of the chord.

In accordance with a second aspect, the invention concerns a fluid-dynamic surface comprising two ends, spaced apart by a distance D, and at least two airfoils in accordance with what is described above. The two airfoils have identical maximum thickness $t_{max}$ and mean lines ml of different lengths.

The manufacturing of such a fluid-dynamic surface is extremely fast and simple compared to what is required by the fluid-dynamic surfaces of known type having airfoils with mean lines ml of different lengths.

Preferably the two airfoils have identical front and rear portions and different central portions. Even more preferably the extension of the central portions in the direction perpendicular to the maximum thickness $t_{max}$ varies with continuity at least along a segment between the two ends.

In some embodiments, the fluid-dynamic surface is a half-wing. In other embodiments, the fluid-dynamic surface is the blade of a rotor.

In accordance with a third aspect, the invention concerns a method for defining an airfoil. The method of the invention comprises the steps of:

- providing a known profile having a front leading edge le, a rear trailing edge te, a mean line ml and a thickness t;

identifying in the known airfoil a front portion in which the thickness t increases, along the mean line ml from the leading edge le backwards, up to a maximum thickness $t_{max}$;

identifying in the airfoil a rear portion in which the thickness t increases, along the mean line ml from the trailing edge te forwards, up to the maximum thickness $t_{max}$;

spacing apart the front portion and the rear portion along a direction perpendicular to the direction of maximum thickness $t_{max}$;

interposing between the front portion and the rear portion a central portion having constant thickness equal to the maximum thickness $t_{max}$.

The method of the invention allows to define in a simple and economical way an airfoil having arbitrary chord in order to adapt it to different needs.

Further features and advantages of the present invention will be more evident from the description of the accompanying drawings.

BRIEF DESCRIPTION OF THE DRAWINGS

The invention will be described below with reference to some examples, provided for explanatory and non-limiting purposes, and illustrated in the accompanying drawings. These drawings illustrate different aspects and embodiments of the present invention and reference numerals illustrating structures, components, materials and/or similar elements in different drawings are indicated by similar reference numerals, where appropriate. Moreover, for clarity of illustration, some references may not be repeated in all drawings.

FIG. 11.*a* is a sectional views of an aerodynamic airfoil which can be obtained with the sections of FIG. 6;

FIG. 11.*b* is a sectional views of an aerodynamic airfoil which can be obtained with the sections of FIG. 6;

FIG. 11.*c* is a sectional views of an aerodynamic airfoil which can be obtained with the sections of FIG. 6;

FIG. 12.*a* is a sectional view of an aerodynamic airfoil which can be obtained with the sections of FIG. 7;

FIG. 12.*b* is a sectional view of an aerodynamic airfoil which can be obtained with the sections of FIG. 7;

FIG. 12.*c* is a sectional view of an aerodynamic airfoil which can be obtained with the sections of FIG. 7;

FIG. 12.*d* is a sectional view of an aerodynamic airfoil which can be obtained with the sections of FIG. 7;

FIG. 12.*e* is a sectional view of an aerodynamic airfoil which can be obtained with the sections of FIG. 7;

FIG. 12.*f* is a sectional view of an aerodynamic airfoil which can be obtained with the sections of FIG. 7;

FIG. 35 is a schematic view of a speed field that hits the blade of an axial fan for industrial use; and FIG. 36.*a* is a sectional view of an aerodynamic airfoil in accordance with the prior art, used in a comparison experiment.

FIG. 36.*b* is a sectional view of an aerodynamic airfoil in accordance with the invention, used in a comparison experiment.

DETAILED DESCRIPTION OF THE EMBODIMENTS

Figures 1, 2, 3:
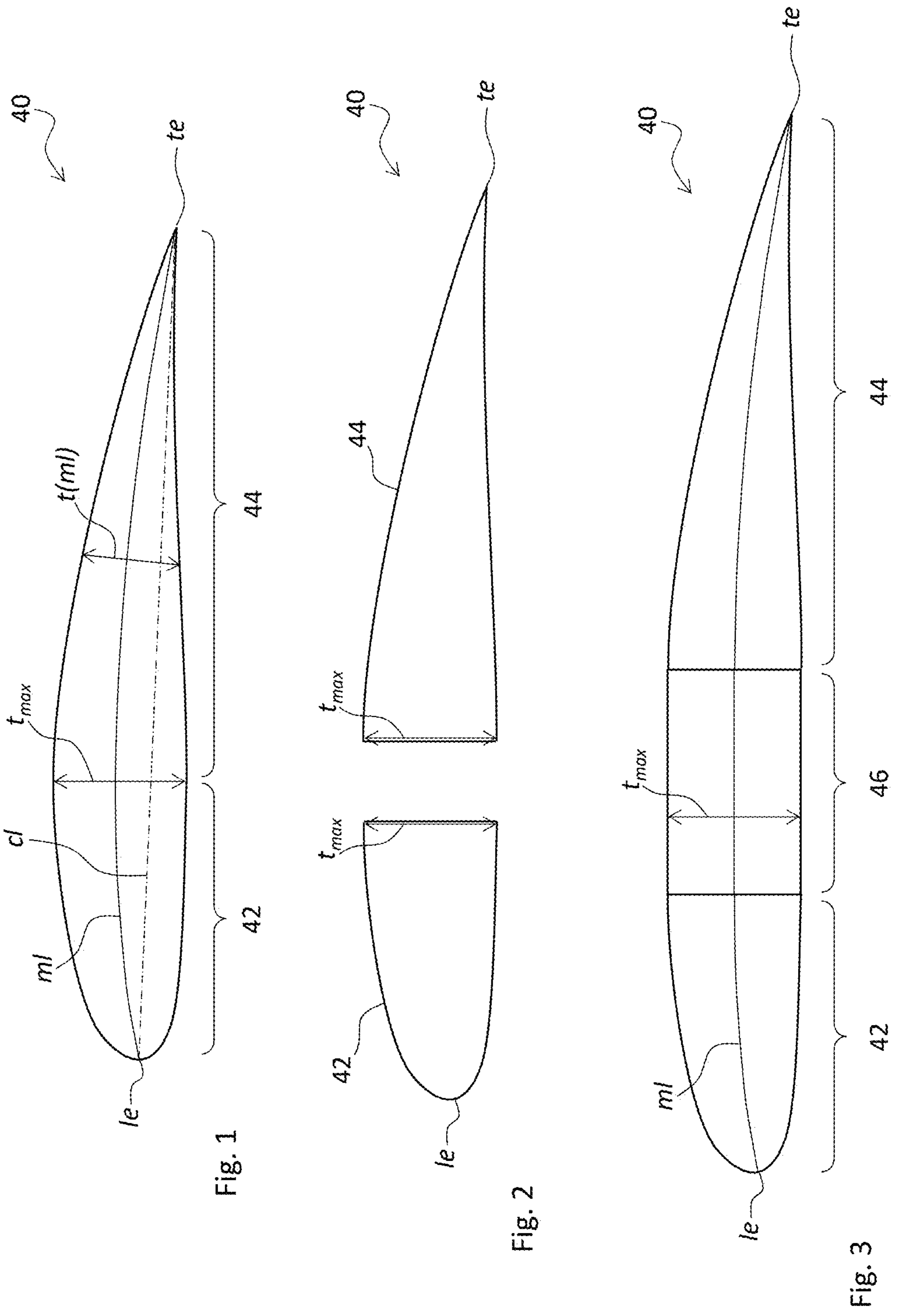
FIG. 1 is a schematic view of a theoretical aerodynamic airfoil in accordance with the prior art.
FIG. 2 is a schematic view of the airfoil of FIG. 1 separated into two parts.
FIG. 3 is a schematic view of a theoretical aerodynamic airfoil in accordance with the invention.
Figure 4:
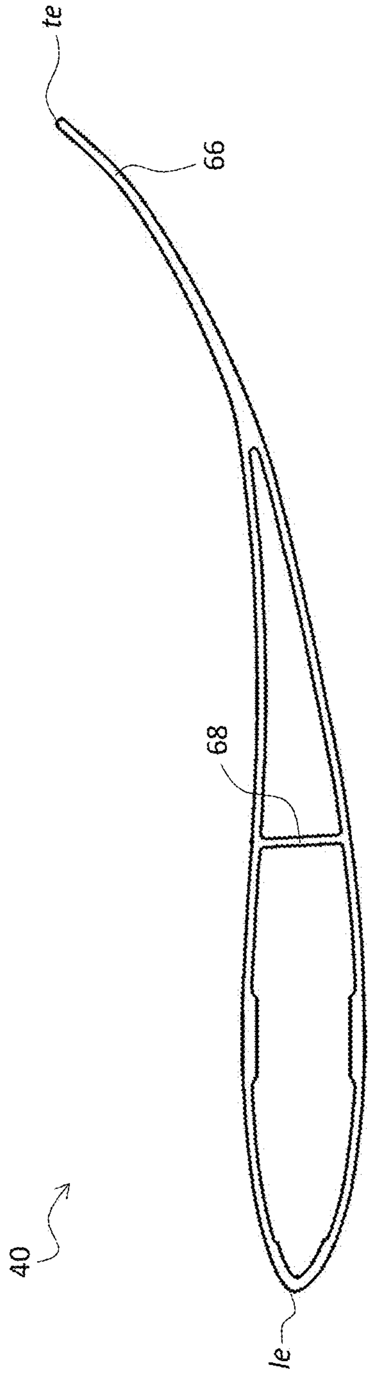
FIG. 4 is a sectional view of a monolithic aerodynamic airfoil in accordance with the prior art.
Figure 5:
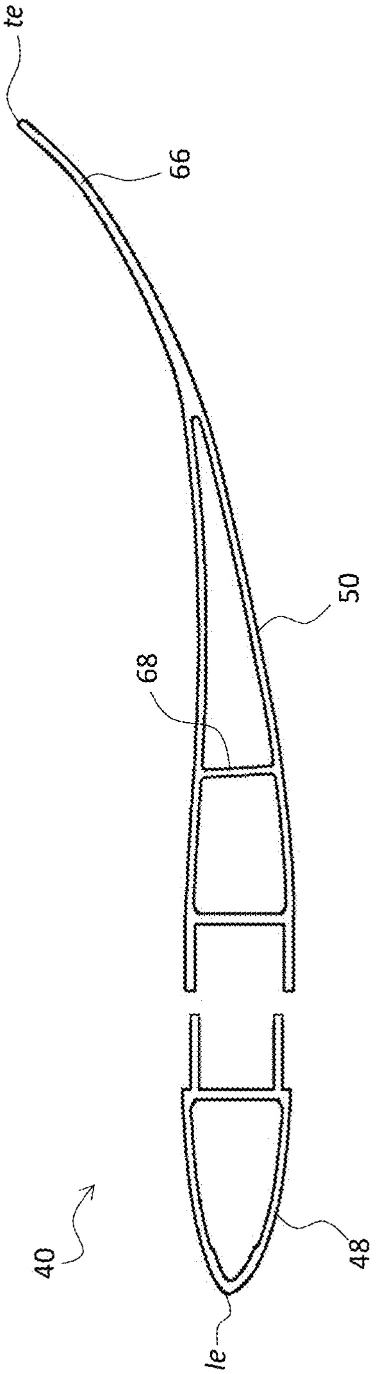
FIG. 5 is a sectional view of an aerodynamic airfoil in two sections in accordance with the prior art.

While the invention is susceptible to various modifications and alternative constructions, some preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The description deals in detail with the peculiar aspects and the technical characteristics of the invention, while the aspects and the technical characteristics per se known can only be hinted at. In these respects, what is reported above with reference to the prior art remains valid.

The use of "for example", "etc.", "or" indicates non-exclusive alternatives without limitation, unless otherwise indicated. The use of "comprises" and "includes" means "comprises or includes, but not limited to", unless otherwise indicated.

In the following discussion, the terms "airfoil" and "fluid-dynamic airfoil" generally indicate a shape, in itself well known to the person skilled in the art, which is adapted to interact with a fluid flow for the purpose of exchanging forces. The term airfoil can therefore take on two slightly different meanings. A first meaning is theoretical and indicates the curve that is graphically drawn on a plane in order to study the realization of a real device. A second meaning is practical and indicates the shape that, in cross-section, reproduces the theoretical airfoil. If it is necessary to distinguish the two meanings, the former can also be referred to as a "theoretical airfoil" and the latter as a "real airfoil".

The airfoil of the invention may be intended to interact with different fluids, for example gases, in particular air, or liquids, in particular water. In the first case the airfoil could be referred to as "aerodynamic airfoil", without thereby introducing any limitation to the interaction with gases other than air. In the second case it could be referred to as a "hydrodynamic airfoil", without thereby introducing any limitation to the interaction with liquids other than water.

The airfoils of the invention are intended to be used in the presence of a fluid flow, thanks to which they are able to perform their function of generating forces. The direction of the flow defines in a unique manner the leading edge and the trailing edge of the airfoil. The direction of the flow also defines for the airfoil the concepts of "forward", "front" and the like with respect to the concepts of "back", "rear" and the like.

In the present discussion, commonly used terms, which are therefore well known to the person skilled in the art, are used to describe the geometric characteristics of the airfoils. These terms have a very clear meaning for the person skilled in the art, although their strict definition can sometimes involve some complications. In particular, also with reference to FIG. 1, the airfoil comprises a leading edge le, which is at the front and rounded, and a trailing edge te, which is at the rear and pointed or sharp. The straight line segment that joins the leading edge to the trailing edge is called chord cl. The term chord is often used, in addition to indicating the chord cl as such, also to indicate more generically the extension of the airfoil in the direction of the flow. Such use, although imprecise, is widely accepted. Furthermore, the airfoil is characterized by a thickness t that varies along the chord. In particular, the thickness increases from the leading edge backwards, until it reaches a maximum, and then decreases and becomes null again at the trailing edge.

For each airfoil, a mean line ml can be defined as the place of the points placed in the middle of the thickness, defined for example as the place of the centres of the circumferences inscribed in the airfoil. Most of the airfoils, such as for example those represented in the accompanying figures, are intended to generate a force directed always in the same direction with respect to the direction of the fluid flow, for example upwards in FIG. 1. In each of these cases it is advantageous that the airfoil is asymmetrical and that the mean line ml is curved and deviates from the chord cl in the direction in which the force is to be generated. In the asymmetric airfoils it is possible to identify in a unique manner a back (or suction surface) and a belly (or pressure surface).

In the following discussion, the thickness t is considered to be a function of the mean line ml and to be measured perpendicularly to it (instead of, for example, perpendicularly to the chord as is the case in other conventions).

In the following discussion, reference is made to fluid-dynamic surfaces, which can be considered as a succession of airfoils juxtaposed to each other along a direction transverse to the airfoils themselves. Each fluid-dynamic surface comprises in a per se known manner a leading edge le, consisting of a line defined as the place of the points of the leading edges le of all the airfoils forming the fluid-dynamic surface. Similarly, each fluid-dynamic surface comprises in a per se known manner a trailing edge te, consisting of a line defined as the place of the points of the trailing edges the of all the airfoils forming the fluid-dynamic surface.

The fluid-dynamic surfaces generally have two ends, spaced apart by a distance D.

The airfoils of the invention can find application in various types of fluid-dynamic surfaces. For example, the airfoils of the invention may find application in aerodynamic surfaces i.e. intended to interact with a flow of gas, typically air but not only, or they may find application in hydrodynamic surfaces i.e. intended to interact with a flow of liquid, typically water but not only.

In addition, some fluid-dynamic surfaces may have a cantilever structure, with a structural constraint at only one end (called root end) and one free end (called distal end). Fluid-dynamic surfaces of this type can be the blades of a rotor, the half-wings and the control and stabilization surfaces of an aircraft with standard configuration, the sail and the rudder of a boat, the blades of a turbomachine and so on. Other fluid-dynamic surfaces can have a different structure, with a different arrangement of the structural constraints, such as for example the inner wing regions of a double fuselage or double tail-beam aircraft, the wings of vehicles, some submerged load-bearing airfoils of boats, some deflectors for civil constructions exposed to the wind, and so on.

Still, the fluid-dynamic surfaces can be intended for different relative movements with respect to the fluid with which they must interact. For example, some fluid-dynamic surfaces of the invention may be intended for a relative primarily translational motion, such as for example wings (or half-wings) of fixed-wing aircraft, control and stabilization surfaces of aircraft, wings of vehicles, sails of boats, immersed surfaces of boats such as stabilizing fins or load-bearing airfoils, deflectors of civil constructions exposed to the wind, and the like. Other fluid-dynamic surfaces of the invention may be intended for a relative primarily rotational motion, such as rotor blades of rotary wing aircraft, rotor blades of industrial fans, propeller blades, turbomachine blades (turbines or compressors), and the like.

The fluid-dynamic airfoils and surfaces of the invention can be used in an industrial axial fan. The axial fan of the invention defines an axis of rotation with respect to which the terms "axial", "radial", and "tangential" are defined in a unique manner.

In accordance with a first aspect, the invention concerns an airfoil 40 comprising a front leading edge le, a rear trailing edge te, a mean line ml and a thickness t, wherein the profile 40 further comprises:

a front portion 42 in which the thickness t increases, along the mean line ml from the leading edge le backwards, up to a maximum thickness $t_{max}$; and a rear portion 44 in which the thickness t increases, along the mean line ml from the trailing edge te forwards, up to the maximum thickness $t_{max}$;

wherein the profile 40 further comprises a central portion 46, placed between the front portion 42 and the rear portion 44, in which the thickness t is constant and equal to the maximum thickness $t_{max}$;

and wherein the airfoil 40 further comprises at least one front section 48 and rear section 50, assembled, wherein:

the front portion 42 is defined by the front section 48; and the rear portion 44 is defined by the rear section 50.

With reference to FIGS. 1 to 3, theoretical airfoils are considered here, regardless of their practical implementation. The theoretical airfoil 40 of FIG. 1, in itself known, comprises a front leading edge le, a rear trailing edge te, a mean line ml and a thickness t. The known theoretical airfoil 40 further comprises:

a front portion 42 in which the thickness t increases along the mean line ml from the leading edge le backwards up to a maximum thickness $t_{max}$; and a rear portion 44 in which the thickness t increases along the mean line ml from the trailing edge te forwards up to the maximum thickness $t_{max}$.

The front portion 42 and the rear portion 44 are also understood here in a theoretical sense, i.e. as the two portions of the curve which are graphically plotted on a plane for study purposes.

FIG. 2 shows a first conceptual step to obtain an airfoil 40 in accordance with the invention starting from the known airfoil 40 of FIG. 1. In particular, FIG. 2 shows a theoretical airfoil 40 similar to the one of FIG. 1, in which the front portion 42 and the rear portion 44 have been conceptually identified, separated and moved away from each other. More in particular, the front portion 42 and the rear portion 44 have been moved away from each other along the direction perpendicular to that of the maximum thickness $t_{max}$. Since the thickness is measured, point by point, in a direction perpendicular to the mean line ml, the front portion 42 and the rear portion 44 have been moved away along the direction of the line tangent to the mean line ml at the point of the maximum thickness $t_{max}$. It should be noted that, from how the airfoils 40 of the type like the one in FIG. 1 are usually drawn, the tangent to the mean line ml, the tangent to the back and the tangent to the belly, all considered at the point of maximum thickness $t_{max}$, are parallel to each other.

FIG. 3 shows an embodiment of the theoretical airfoil 40 of the invention obtained by modifying the airfoil 40 of FIG. 1. In particular, with respect to the airfoil 40 of FIG. 1, the airfoil 40 of FIG. 3 further comprises a central portion 46, placed between the front portion 42 and the rear portion 44, wherein the thickness t is constant and equal to the maximum thickness $t_{max}$. Based on what is defined above, the central portion 46 assumes a rectangular shape with two sides with length equal to the maximum thickness $t_{max}$ and two other sides with arbitrary a priori length.

In a manner known per se, the airfoil 40 of the invention has a back (or suction surface), a belly (or pressure surface), and a mean line ml. Preferably the back and/or the belly and/or the mean line ml are continuous (without discontinuity) and uniform (without steps, edges or sharp changes in direction). In particular, the central portion 46 does not introduce any discontinuities, neither in the surface of the back, nor in the surface of the belly, nor in the mean line ml.

The invention also concerns the practical manufacturing of the theoretical airfoil 40 described above in relation to FIG. 3. In particular, as anticipated above, the actual airfoil 40 in accordance with the invention is obtained by assembling at least a front section 48 and a rear section 50, wherein:

the front portion 42 is defined by the front section 48; and the rear portion 44 is defined by the rear section 50.

Preferably the front section 48 and the rear section 50 are obtained by means of extrusion/pultrusion.

As the person skilled in the art can well understand, the front section 48 and the rear section 50 are understood here in a practical sense, i.e. as two sections which are materially produced (for example in aluminium or composite material) and which are intended to be assembled to form the actual airfoil 40.

In accordance with the invention, the front section 48 and the rear section 50 can be obtained by means of extrusion or by means of pultrusion. Both of these processes, well known to the person skilled in the art, have been briefly described with reference to the prior art.

As already mentioned, extrusion can be used mainly for metallic but also polymeric materials. For the purposes of the invention, it is understood below that the pieces obtained by extrusion are of aluminium, because this is the material mostly used in the various fields of application of the invention. However, as the person skilled in the art can well understand, nothing would change if the pieces obtained by extrusion were made of other metals such as steel, titanium, magnesium or other alloys.

Similarly, pultrusion can be used for various types of composite materials. For the purposes of the invention, it is understood below that the pieces obtained by pultrusion are of glass fibres in epoxy matrix, because this is the material mostly used in the various fields of application of the invention. However, as the person skilled in the art can well understand, nothing would change if the pieces obtained by pultrusion were made with other fibres (such as for example carbon or polyaramid fibres) and/or with other matrices (such as other thermosetting matrices (such as polyester, acrylic, vinyl ester) or even thermoplastic matrices (such as PVC, polyurethane, polyethylene).

Figure 6:
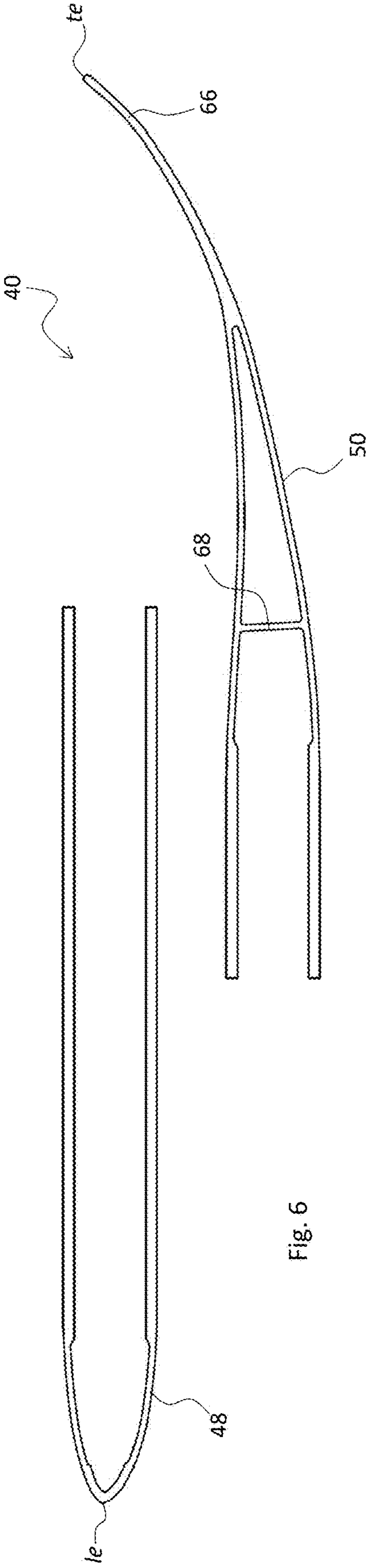
FIG. 6 is a sectional view of an aerodynamic airfoil in two sections in accordance with the invention.
Figure 9:
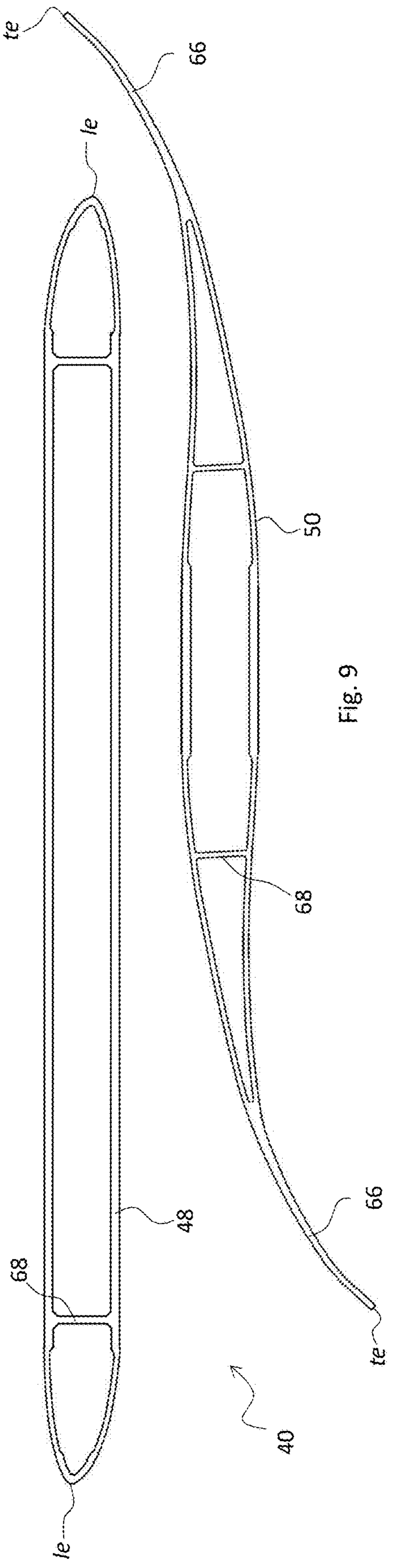
FIG. 9 is a sectional view of an aerodynamic airfoil in two double sections in accordance with the invention.
Figure 10:
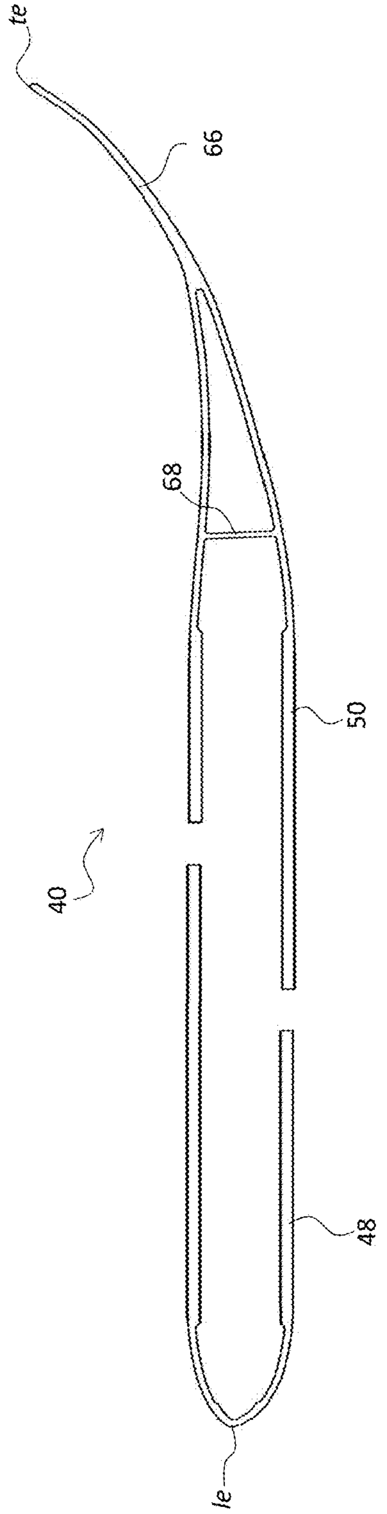
FIG. 10 is a sectional view of an aerodynamic airfoil in two sections in accordance with the invention.
Figure 16:
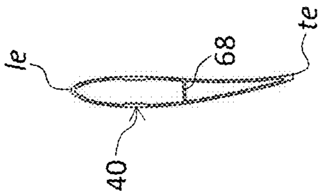
FIG. 16 is a view of the section operated along the line XVI-XVI of FIG. 14.
Figure 15:
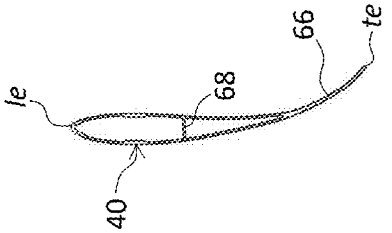
FIG. 15 is a sectional view operated along any one of the lines XV-XV of FIG. 13 or 14.
Figure 13:
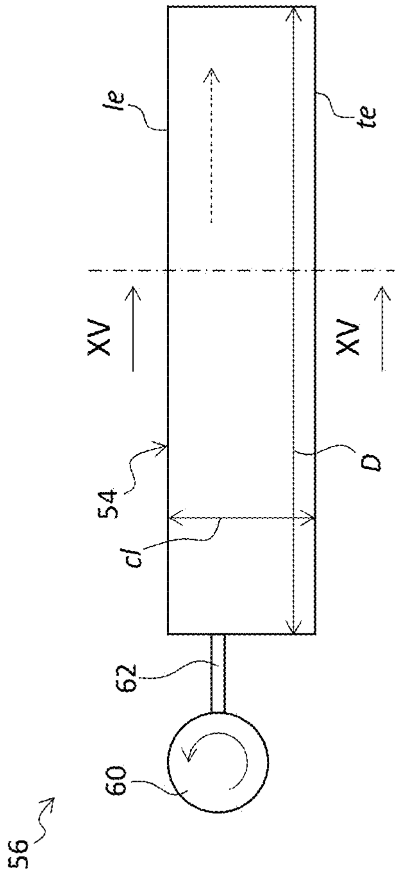
FIG. 13 is a schematic plan view of a blade of an axial fan in accordance with the prior art.
Figure 14:
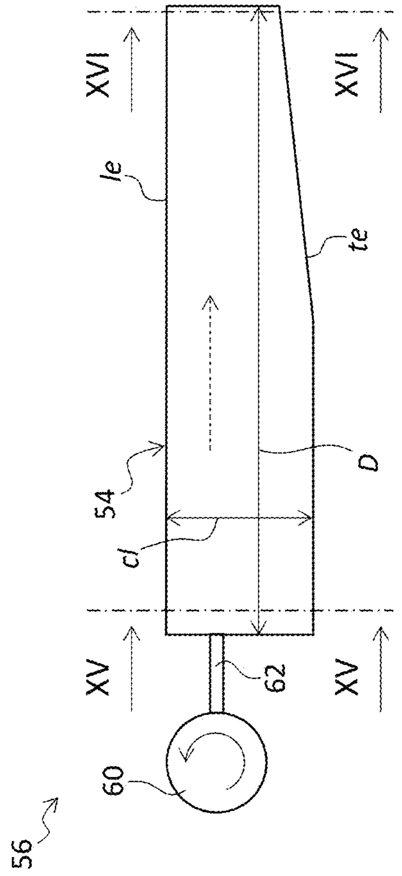
FIG. 14 is a schematic plan view of a blade of an axial fan in accordance with the prior art.
Figure 20:
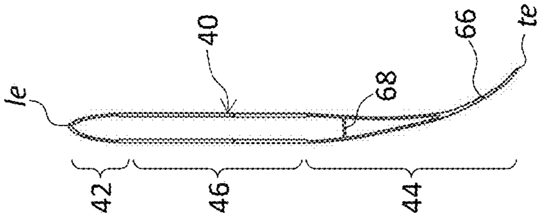
FIG. 20 is a sectional view operated along any one of the lines XX-XX of FIG. 17 or 18.
Figure 19:
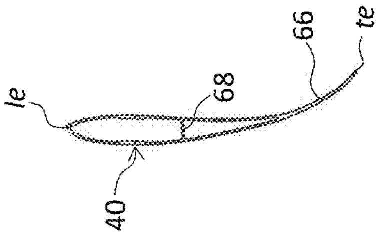
FIG. 19 is a sectional view operated along any one of the lines XIX-XIX of FIG. 17 or 18.

In accordance with some embodiments, such as for example those of FIGS. 6, 9 and 10, the central portion 46 of the airfoil 40 of the invention is defined by the front section 48 and/or by the rear section 50. In other words, the central portion 46 of the airfoil 40, having constant thickness $t_{max}$, is defined by a backward lengthening of the front section 48 and/or by a forward lengthening of the rear section 50. This embodiment of the airfoil 40 does not need a central section 52, thus simplifying the manufacturing of the airfoil 40 and limiting the relative costs, due for example to the provision of the extrusion/pultrusion dies.

Figure 7:
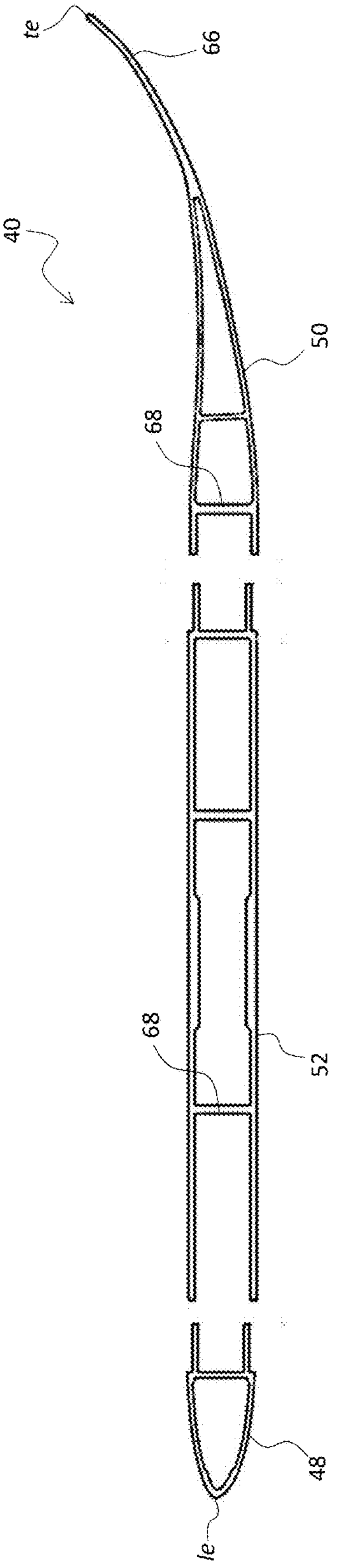
FIG. 7 is a sectional view of an aerodynamic airfoil in three sections in accordance with the invention.
Figure 8:
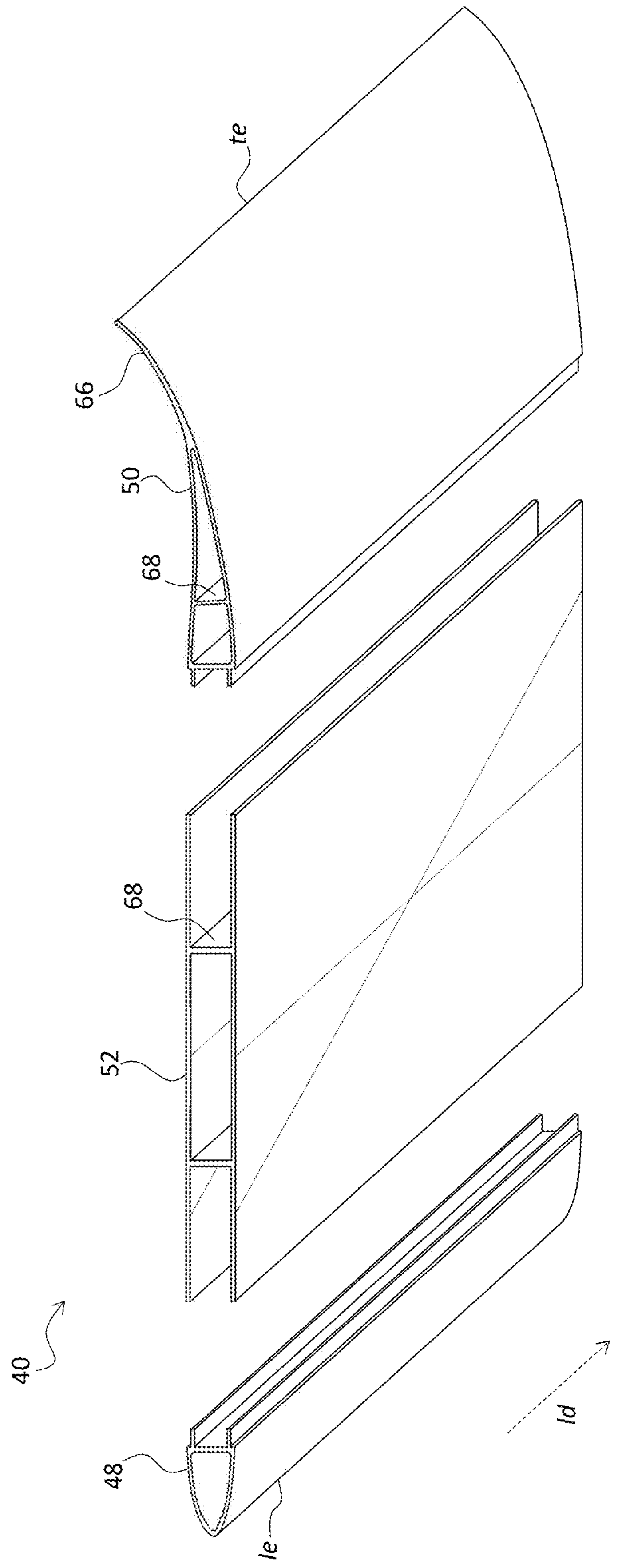
FIG. 8 is a schematic axonometric view of an aerodynamic airfoil in three sections in accordance with the invention.

In accordance with some embodiments, such as for example those of FIG. 7 or 8, the airfoil 40 further comprises a central section 52. In accordance with these embodiments, the central portion 46 of the airfoil 40 is defined at least partially by the central section 52. In other words, the central portion 46 of the airfoil 40, having constant thickness $t_{max}$, is defined by the central section 52, but it can also be defined in part by a possible backward lengthening of the front section 48 and/or by a possible forward lengthening of the rear section 50. This embodiment of the airfoil 40 allows a huge variation of the chord cl.

In accordance with some embodiments, for example those of FIGS. 7 and 8, the central section 52 is obtained by means of extrusion/pultrusion, in the same way as the front and rear sections 48, 50.

In other embodiments, not shown but similar to the one of FIG. 8, the central section 52 may be obtained differently. For example, considering FIG. 8, it can easily be understood that the central section 52 can be left out and that two simple sheet metal or polymeric strips can be used in its place. Such a simpler solution could involve some problems related to the overall stiffness of the airfoil 40, but the person skilled in the art would certainly be able to remedy it, for example by providing within the airfoil 40 itself a lengthening of the root structure or another auxiliary stiffening structure.

In accordance with a second aspect, the invention also concerns a fluid-dynamic surface 54 comprising two ends, spaced apart by a distance D. The fluid-dynamic surface 54 further comprises at least two airfoils 40 in accordance with the invention, wherein the two airfoils 40 have identical maximum thickness $t_{max}$ and mean lines ml of different lengths.

In other words, the fluid-dynamic surface 54 of the invention comprises any variation of the chord cl of the airfoil 40 along its extension (or distance D), while keeping the maximum thickness $t_{max}$ identical.

In the case where the fluid-dynamic surface 54 has a cantilever structure, it is possible to distinguish a root end, placed near the structural constraint, and a free distal end.

Figure 29:
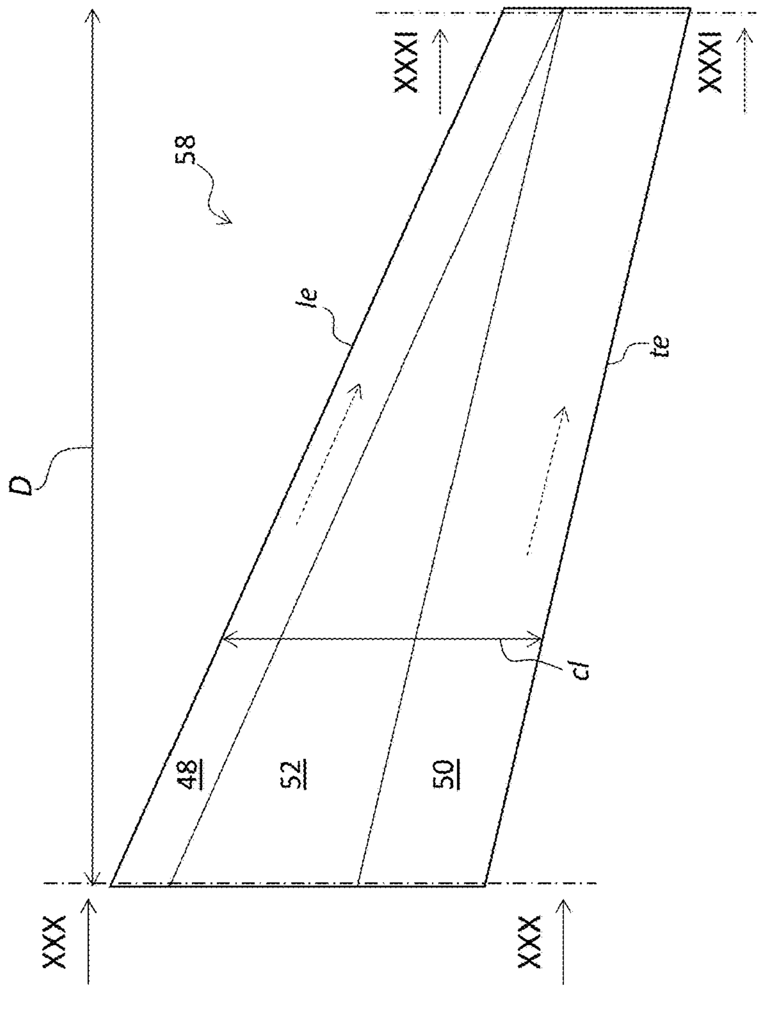
FIG. 29 is a schematic plan view of a half-wing in accordance with the invention.
Figure 34:
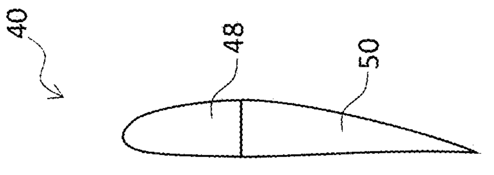
FIG. 34 is a sectional view operated along the line XXXIV-XXXIV of FIG. 32.
Figure 33:
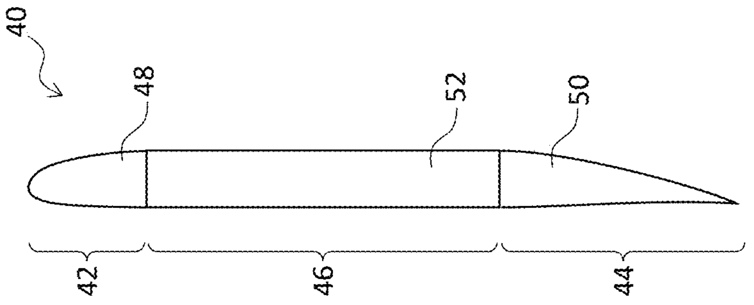
FIG. 33 is a sectional view operated along the line XXXIII-XXXIII of FIG. 32.
Figure 32:
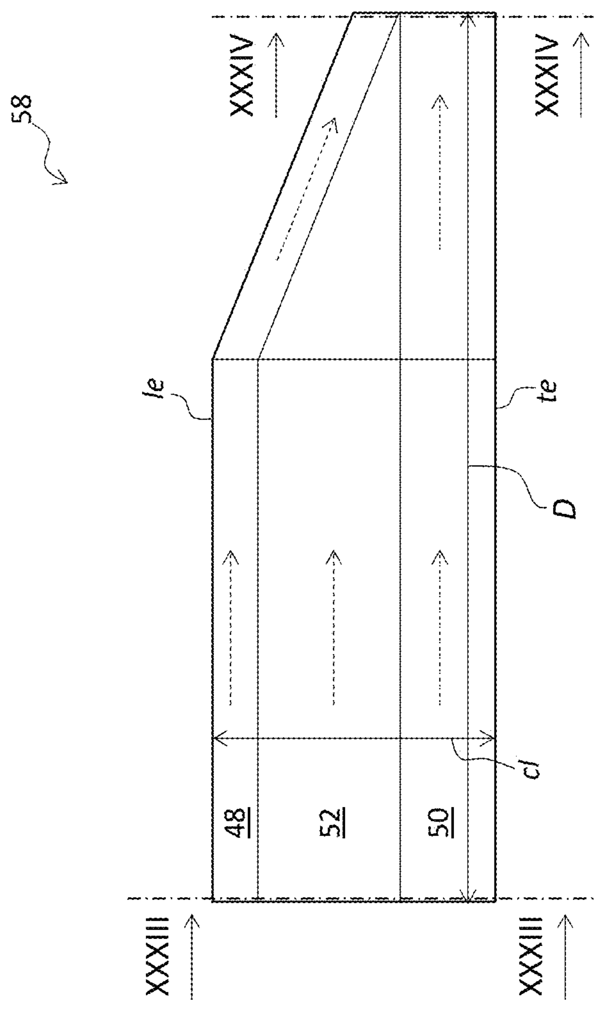
FIG. 32 is a schematic plan view of a half-wing in accordance with the invention.

A cantilever fluid-dynamic surface 54 of the invention may for example be that of the blade 56 of a rotor (see for example FIGS. 17, 18, 21, 22 and 25-28) or the half-wing 58 of an aircraft (see for example FIGS. 29 and 32). In the case of the blade 56, the root end is the radially inner one, connected to the hub 60 by means of the root structure 62, while the distal end is the radially outer one. In the case of the half-wing 58, the root end is the one structurally connected to the aircraft, while the distal end is the free end, also called wing tip.

Preferably, in the fluid-dynamic surface 54 described above, the at least two airfoils 40 have identical front 42 and rear 44 portions and different central portions 46.

In light of what is reported above, the invention also contemplates fluid-dynamic surfaces 54 which comprise a sudden variation of the chord cl, for example passing from a first region having a constant airfoil 40 to pass abruptly to a second region also having a constant airfoil 40 but different from the airfoil 40 of the first region. In this case therefore identical front 42 and rear 44 portions are joined, in the two different regions of the aerodynamic surface, to different central portions 46. A sudden variation of the chord cl of this type implies a step along the leading edge le and/or a step along the trailing edge te. Such a solution rarely finds application and is not represented in the accompanying figures.

Some cases in which a step can be provided along the leading edge le of an arrow-like half-wing 58 may be those in which it is wished to adopt one of the solutions, known in itself, which in the aeronautical terminology are called dogtooth or notch. Both of these solutions create a sudden discontinuity in the flow above the half-wing 58 with the effect of stopping the unwanted air flow directed along the span of the half-wing 58.

Notwithstanding the particular cases described above, the preferred embodiments of the fluid-dynamic surface 54 of the invention are those in which the extension of the central portions 46 in the direction perpendicular to the maximum thickness $t_{max}$, varies with continuity at least along a segment between the two ends.

In other words, the preferred embodiments of the fluid-dynamic surface 54 of the invention are those in which the chord cl varies with continuity at least in segments along the distance D, like for example in the blades 56 of FIGS. 17, 18, 21, 22 and 25-28 and like in the half-wings 58 of FIGS. 29 and 32.

As can be noted, in these embodiments both the leading edge le and the trailing edge te are defined, in plan, by continuous lines formed by straight line segments, possibly by broken lines like in the blades 56 of FIGS. 18, 21, 22, 26 and 28 and like in the half-wing 58 of FIG. 32.

In the accompanying figures, the dashed arrows indicate the extrusion/pultrusion direction or longitudinal direction ld of each section 48, 50, 52 of the airfoils 40 of the invention. As the person skilled in the art can well understand, in the front 48 and rear 50 sections the longitudinal directions ld are in a unique manner defined and can only be parallel respectively to the leading edge le and to the trailing edge te in the absence of a trim. On the contrary, for the central sections 52 the longitudinal direction ld is not in a unique manner defined in a plan view since they can undergo small rotations in their own plane without any external effect.

As can be noted, the longitudinal directions ld of the various extruded/pultruded sections 48, 50, 52 comprised in a single fluid-dynamic surface 54 of the invention can form angles between each other. This possibility introduces important degrees of freedom in the design and in the realization of fluid-dynamic surfaces 54 comprising extruded/pultruded airfoils 40. In accordance with the prior art, in the fluid-dynamic airfoils 40 composed of several extruded/pultruded sections 48, 50 the latter could only be assembled by arranging the respective longitudinal directions ld parallel to each other. In accordance with the invention instead, the different sections 48, 50, 52 can be rotated with respect to each other around axes parallel to the maximum thickness $t_{max}$. In fact, in accordance with the invention, the belly and the back of the central sections 52 are flat and parallel to each other, therefore these rotations do not introduce any discontinuity in the fluid-dynamic surface 54.

The different sections 48, 50, 52 forming an airfoil 40 in accordance with the invention may be joined together in a manner known per se. For example, the extruded/pultruded sections 48, 50, 52 may be joined by gluing, riveting, bolting, possibly with the interposition of a joining element 64. In addition, the metallic extruded sections 48, 50, 52 may also be joined by welding or brazing.

Some peculiarities of the embodiments of the airfoil 40 of the invention that are shown by way of example in the accompanying figures are described below.

FIGS. 6, 9, 10 and 11 show airfoils 40 according to the invention comprising only two sections: a front section 48 and a rear section 50.

FIG. 6 shows the airfoil 40 disassembled, while FIG. 11 show some examples of how the airfoil 40 may be assembled. The fact that the airfoil 40 comprises a rear appendage 66 with high curvature identifies it as an airfoil 40 intended for the manufacturing of a blade 56 of an axial fan for industrial use. For this reason, it is represented with the back downwards and with the belly upwards, since the industrial fans are usually (although not necessarily) mounted in such a way as to create an air flow that moves from the bottom up.

As the person skilled in the art can note, FIGS. 11.*b* and 11.*c* clearly show the characteristics of the invention, i.e. the central portion 46 having constant thickness equal to the maximum thickness $t_{max}$. In contrast, the airfoil 40 of FIG. 11.*a*, which is the one with the minimum chord among those that can be obtained with the two sections 48, 50 of FIG. 6, is very similar to an airfoil 40 of the prior art.

As already described above, in this type of airfoils 40 comprising two sections 48, 50, the central portion 46 with constant thickness can be defined by a backward lengthening of the front section 48 and/or by a forward lengthening of the rear section 50. In accordance with the current technological limits, the airfoil 40 of the invention of FIGS. 6 and 11 can have a maximum chord cl of about 100 cm in a configuration similar to the one of FIG. 11.*c*.

As can be seen in the schematic views of FIGS. 11, a joining element 64 is represented, in particular a tubular element with a quadrangular section. The joining element 64, although not strictly necessary, facilitates joining the two sections 48, 50. In some particular cases, the joining element 64 may be a lengthening of the root structure 62 that constrains the blade 56 to the hub 60.

FIGS. 7 and 12 show an airfoil 40 according to the invention, disassembled, comprising three sections: a front section 48, a rear section 50 and a central section 52. Also in this case, the fact that the airfoil 40 comprises a rear appendage 66 with high curvature identifies it as an airfoil 40 intended for the manufacturing of a blade 56 of an axial fan for industrial use. The airfoil 40 is therefore represented with the back downwards and with the belly upwards.

As the person skilled in the art can see, the front section 48 comprises a backward facing male interface, the rear section 50 comprises a forward facing female interface, while the central section 52 comprises a backward facing male interface and a forward facing female interface. The provision of the interfaces allows the sections 48, 50, 52 to be easily joined, for example by gluing or riveting, without the need for a joining element 64.

As the person skilled in the art can well understand, the use of the central section 52 as represented in FIGS. 7 and 12.*f* leads to the manufacturing of the airfoil 40 having maximum chord among those that can be obtained with these sections 48, 50, 52. On the contrary, the total exclusion of the central section 52, i.e. the union of the front section 48 directly to the rear section 50 like in FIG. 12.*a*, leads to the manufacturing of the airfoil 40 having minimum chord which is very similar to an airfoil 40 of the prior art. In the manufacturing of the airfoils 40 having intermediate chord lengths (FIGS. 12.*b* to 12.*e*), the central section 52 must be cut to size so as to give it the desired extension in the direction of the mean line ml. As the person skilled in the art can well understand, it is preferable to cut the central section 52 at the front part, i.e. on the part of the female interface, so as to maintain the male interface for the union with the rear section 50. In many positions (e.g. those of FIGS. 12.*b* to 12.*e*) the cut generates a new female interface identical to the original one and suitable for the union with the male interface of the front section 48. In cases where the cut should involve a point where internal stiffening elements 68 are provided, it is possible to restore the female interface by means of simple milling.

In accordance with the current technological limits, the airfoil 40 of the invention of FIGS. 7 and 12 can have a maximum chord of about 150 cm.

FIG. 8 shows an airfoil 40, disassembled, according to the invention comprising three sections: a front section 48, a rear section 50 and a central section 52. Also in this case, the fact that the airfoil 40 comprises a rear appendage 66 with high curvature, identifies it as an airfoil 40 intended for the manufacturing of a blade 56 of an axial fan for industrial use. The airfoil 40 is therefore represented with the back downwards and with the belly upwards.

As the person skilled in the art can see, the front section 48 comprises a backward facing male interface, the rear section 50 comprises a forward facing male interface, while the central section 52 comprises two female interfaces that are both backward and forward facing. The provision of the interfaces allows the sections 48, 50, 52 to be easily joined, for example by gluing or riveting, without the need for a joining element 64.

As the person skilled in the art can well understand, the use of the central section 52 as represented in FIG. 8 leads to the manufacturing of the airfoil 40 having maximum chord among those that can be obtained with these sections 48, 50, 52. On the contrary, the total exclusion of the central section 52, i.e. the union of the front section 48 directly to the rear section 50, leads to the manufacturing of the airfoil 40 having minimal chord which is very similar to an airfoil 40 of the prior art. In this specific case, the union between the front section 48 and the rear section 50 requires the use of external joining elements 64, at least to fill the steps formed by the interfaces on the surfaces of the back and of the belly. The joining elements 64 can be two simple sheet metal or polymeric strips arranged along the longitudinal direction ld. In the manufacturing of the airfoils 40 having intermediate chord lengths, the central section 52 must be cut to size so as to give it the desired extension in the direction of the mean line ml. As the person skilled in the art can well understand, there are no constraints for cutting the central section 52, since in any case it generates a new female interface identical to the original one and suitable for the union with the male interface of the other two sections. As already mentioned above, in cases where the cut should involve a point where internal stiffening elements 68 are provided, it is possible to restore the female interface by means of simple milling.

The particular shape of the central section 52 of FIG. 8 allows to obtain possibly two central portions 46, possibly identical to each other, for example by means of a cut similar to the ones indicated by the dotted lines. In particular, two rectangular central portions 46 are obtained with a cut along the mean line, while two trapezoidal central portions 46 are obtained with the inclined cut. In any case, each of the two central portions 46 (either rectangular or trapezoidal) comprises the female interfaces for the union to the respective front 48 and rear 50 sections. As already mentioned above, in cases where the cut should involve a point where internal stiffening elements 68 are provided, it is possible to restore the female interface by means of simple milling. This particularity of the central section 52 of FIG. 8 allows to obtain two fluid-dynamic surfaces 54 using a single central section 52, providing of course the front 48 and/or rear 50 sections of the correct lengths. This makes it possible to use all the parts obtained by cutting the central section 52 and to greatly limit the material scrap.

In accordance with the current technological limits, the airfoil 40 of the invention of FIG. 8 can have a maximum chord of about 150 cm.

Results similar to the ones of the airfoil 40 of FIG. 8 can also be obtained with the airfoil 40 in two double sections of FIG. 9, wherein the double shape of the front section 48 and of the rear section 50 allows to minimize the material scrap. Also in this case, in fact, as already described above in relation to the embodiment of FIG. 8, it is possible to cut the double front section 48, both along the longitudinal direction ld, and along a direction inclined with respect to the longitudinal direction ld, thus obtaining two front sections 48, respectively rectangular or trapezoidal in plan, possibly identical to each other. Similarly, it is possible to make the cut of the double rear section 50, both along the longitudinal direction ld, and along a direction inclined with respect to the longitudinal direction ld, thus obtaining two rear sections 50, respectively rectangular or trapezoidal in plan, possibly identical to each other.

Note that double sections 48, 50 having central symmetry, such as those in FIG. 9, are particularly suitable for realizing two mutually specular aerodynamic surfaces 54, such as for example the two half-wings of a single aircraft. In such double sections 48, 50 with central symmetry, the cut inclined with respect to the longitudinal direction ld, in fact originates two trapezoidal sections specular to each other. Otherwise, other double sections 48, 50 having axial symmetry (not shown) are particularly suitable for realizing two aerodynamic surfaces 54 identical to each other, such as for example two blades of a single rotor. In such double sections 48, 50 with axial symmetry, the cut inclined with respect to the longitudinal direction ld, in fact, originates two trapezoidal sections identical to each other.

The cut of double sections allows to obtain, as described above, sections 48, 50, each of which comprises an interface analogous to that of the sections 48, 50 of FIG. 6, thus allowing an assembly analogous to that of FIGS. 11. It should be noted, among other things, that the sections 48, 50 of the airfoil of FIG. 9, once cut, they are also perfectly compatible with single sections 48, 50 such as those of FIG. 6, provided that they have the same maximum thickness $t_{max}$. As already mentioned above, in cases where the cut should involve a point where internal stiffening elements 68 are provided, it is potentially possible to restore the female interface by means of simple milling. This particularity of the solution of FIG. 9 allows to use all the parts obtained by cutting the front 48 and rear 50 sections, and to greatly limit the material scrap.

To meet specific needs, the practical manufacturing of the airfoil 40 in accordance with the invention may also envisage the use of sections 48, 50 and 52 having different lengths on the back and on the belly. An example of this embodiment is schematically shown in FIG. 10. In the front section 48 of FIG. 10, the wall defining the belly extends posteriorly more than the one defining the back. Conversely, in the rear section 50 of FIG. 10, the wall defining the back extends forward more than the one defining the belly. This particular solution can be obtained during the manufacturing of the airfoil 40, by providing the front portion 48 and/or the rear portion 50 by means of two cuts spaced along the mean line ml.

Some peculiarities of the embodiments of the fluid-dynamic surfaces 54 of the invention that are shown by way of example in the accompanying figures are described below.

Figure 17:
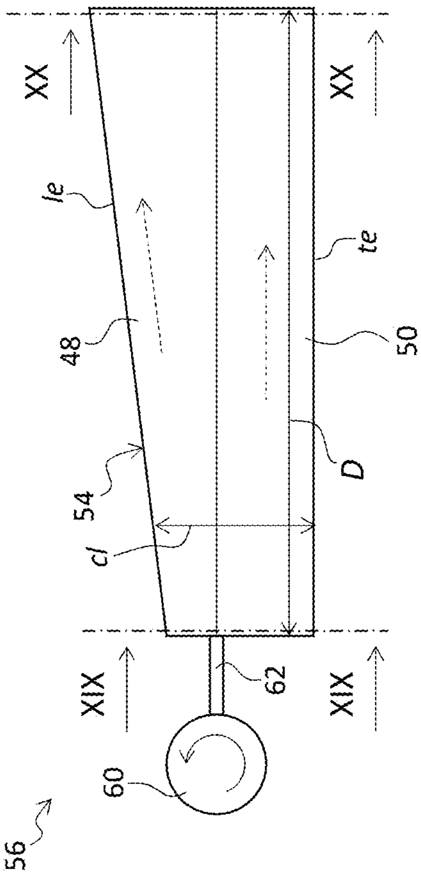
FIG. 17 is a schematic plan view of a blade of an axial fan in accordance with the invention.
Figure 18:
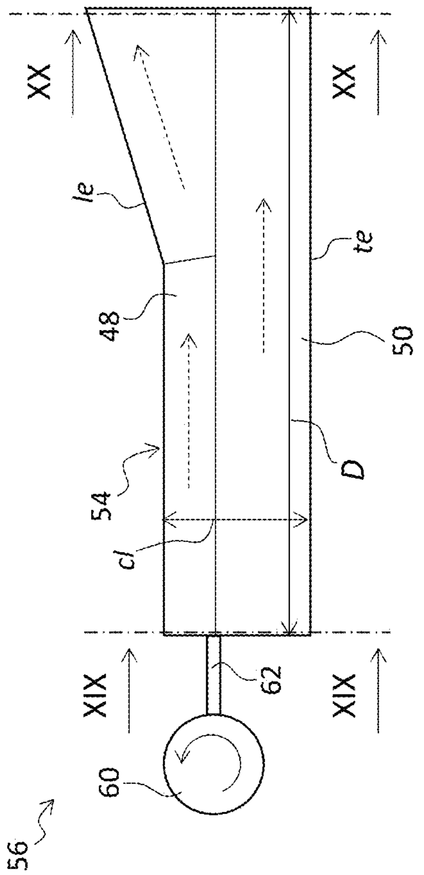
FIG. 18 is a schematic plan view of a blade of an axial fan in accordance with the invention.
Figure 24:
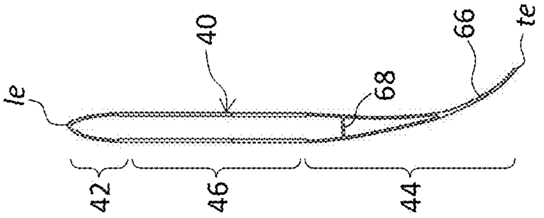
FIG. 24 is a view of the section operated along any one of the lines XXIV-XXIV of FIG. 21 or 22.
Figure 23:
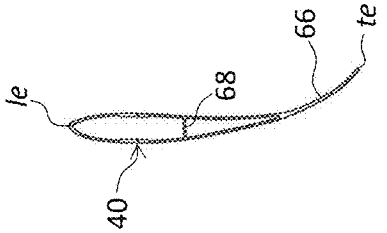
FIG. 23 is a view of the section operated along the line XXIII-XXIII of FIG. 21.

FIGS. 17 and 18 schematically show in plan two blades 56 for an axial fan for industrial use. Both blades 56 use an airfoil 40 similar to the one described above in relation to FIGS. 6 and 11. Both blades 56, although different from each other, show an increase of the chord cl towards the distal (radially outer) end. The increase of the chord in the radially outer region of the blade 56 allows, in a manner known per se, to limit the sound emissions generated by the fan during operation.

In the blade 56 of FIG. 17 both the leading edge le and the trailing edge te are straight. With respect to the radial direction, the leading edge le is inclined forwards i.e. in the direction of rotation of the blade 56. Conversely, the trailing edge te is parallel to the radial direction. As can be seen, the blade 56 comprises a single stretch of rear section 50 having a rectangular plan shape, therefore having a constant chord cl, and a single stretch of front section 48 having a trapezoidal plan shape, therefore having a chord cl variable along the distance D. The dashed arrows indicate the longitudinal directions ld of each of the sections 48, 50, inclined with respect to each other.

In the blade 56 of FIG. 18 the trailing edge te is straight, while the leading edge le is defined by a broken line. The trailing edge te is parallel to the radial direction, while the leading edge le is parallel over a radially inner segment and inclined forward over a radially outer segment. As can be seen, the blade 56 comprises a single stretch of rear section 50 having a rectangular plan shape, therefore having a constant chord cl. The blade 56 further comprises a radially inner stretch of front section 48 having a substantially rectangular plan shape, therefore having a constant chord cl and a radially outer stretch of front section 48 having a trapezoidal plan shape, therefore having a chord cl variable along the distance D. The dashed arrows indicate the longitudinal directions ld of each stretch of the sections 48, 50. Preferably the union between the two stretches of the front section 48 takes place along the bisector of the angle formed by the respective leading edges le.

Figure 21:
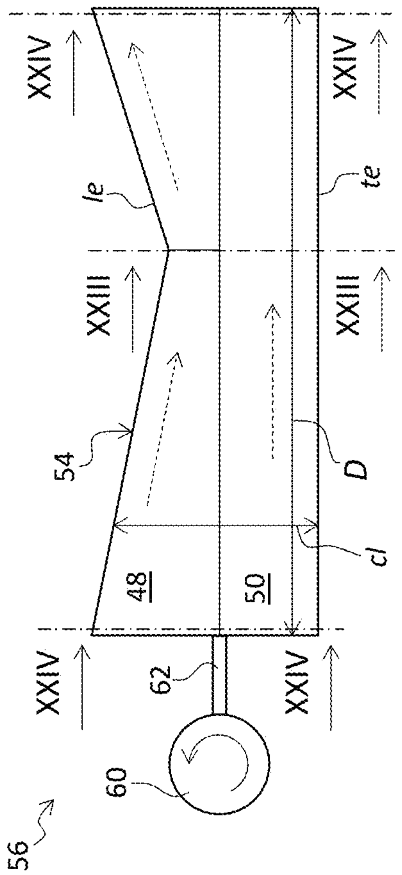
FIG. 21 is a schematic plan view of a blade of an axial fan in accordance with the invention.
Figure 22:
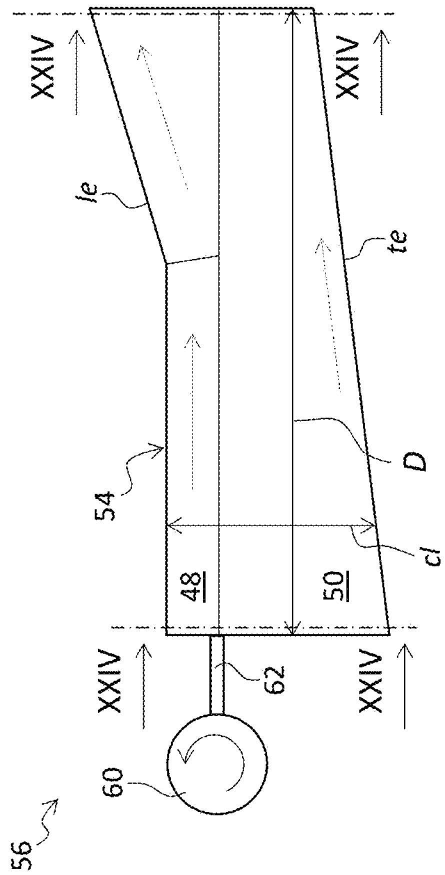
FIG. 22 is a schematic plan view of a blade of an axial fan in accordance with the invention.
Figure 25:
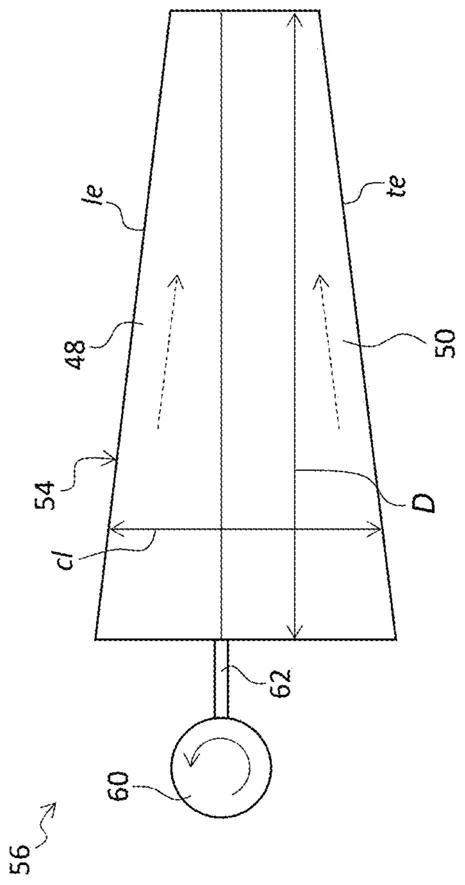
FIG. 25 is a schematic plan view of a blade of an axial fan in accordance with the invention.

FIGS. 21 and 22 schematically show in plan two blades 56 for an axial fan for industrial use. Both blades 56 use an airfoil 40 similar to the one described above in relation to FIGS. 6 and 11. Both blades 56, although different from each other, show an increase of the chord cl both towards the root end (radially inner) and towards the distal end (radially outer), with a minimum intermediate. In a manner known per se, increasing the chord cl in the radially inner region of the blade 56 improves the overall efficiency of the fan. Increasing the chord cl in the radially outer region of the blade 56 allows, in a manner known per se, to limit the sound emissions generated by the fan during operation.

In the blade 56 of FIG. 21 the trailing edge te is straight, while the leading edge le is defined by a broken line. The trailing edge te is parallel to the radial direction, while the leading edge le is inclined backwards (i.e. opposite the direction of rotation) over a radially inner segment and inclined forward over a radially outer segment. As can be seen, the blade 56 comprises a single stretch of rear section 50 having a rectangular plan shape, therefore having a constant chord cl. The blade 56 further comprises two stretches of front section 48, one radially inner and one radially outer, both having a trapezoidal shape, thus having chord cl variable along the distance D. The chord cl of the blade 56 reaches its minimum at the union between the two stretches of front section 48. The dashed arrows indicate the longitudinal directions ld of each stretch of the sections 48, 50. Preferably the union between the two stretches of the front section 48 takes place along the bisector of the angle formed by the respective leading edges le.

In the blade 56 of FIG. 22 the trailing edge te is straight, while the leading edge le is defined by a broken line. The trailing edge te is inclined forward, while the leading edge le is parallel to the radial direction over a radially inner segment and inclined forward over a radially outer segment. As can be seen, the blade 56 comprises a single stretch of rear section 50 having a trapezoidal plan shape, therefore having a chord cl variable along the distance D. The blade 56 further comprises two stretches of front section 48, a radially inner one having a substantially rectangular plan shape therefore having a constant chord cl, and a radially outer one having a trapezoidal plan shape, therefore having a chord cl variable along the distance D. The chord d of the blade 56 reaches its minimum near the union between the two stretches of front section 48. The dashed arrows indicate the longitudinal directions ld of each stretch of the sections 48, 50. Preferably the union between the two stretches of the front section 48 takes place along the bisector of the angle formed by the respective leading edges le.

FIGS. 25 to 28 show schematically in plan other blades 56 for axial fans for industrial use comprising airfoils 40 similar to the one described above in relation to FIGS. 6 and 11. Such blades 56 represent other possible embodiments of the invention in which the solutions described above with reference to the blades 56 of FIGS. 17 to 22 are applied in different ways.

Figure 26:
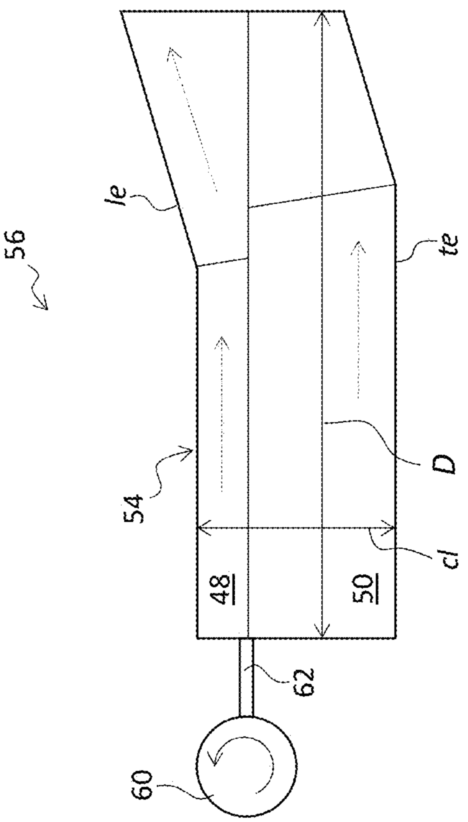
FIG. 26 is a schematic plan view of a blade of an axial fan in accordance with the invention.
Figure 27:
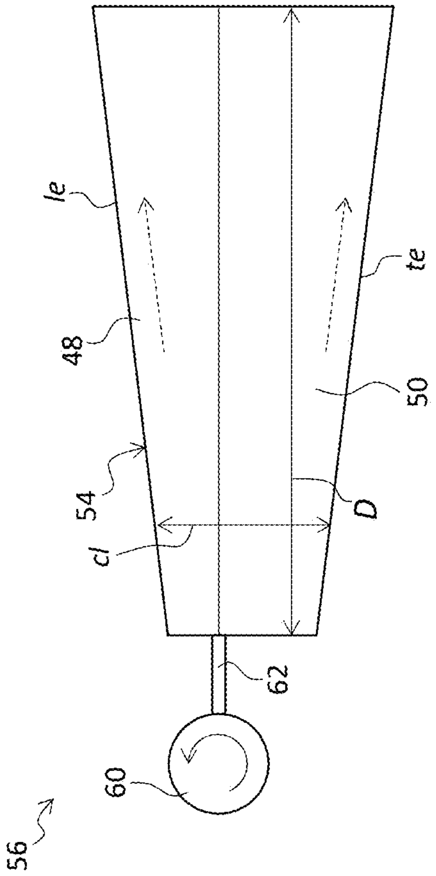
FIG. 27 is a schematic plan view of a blade of an axial fan in accordance with the invention.
Figure 28:
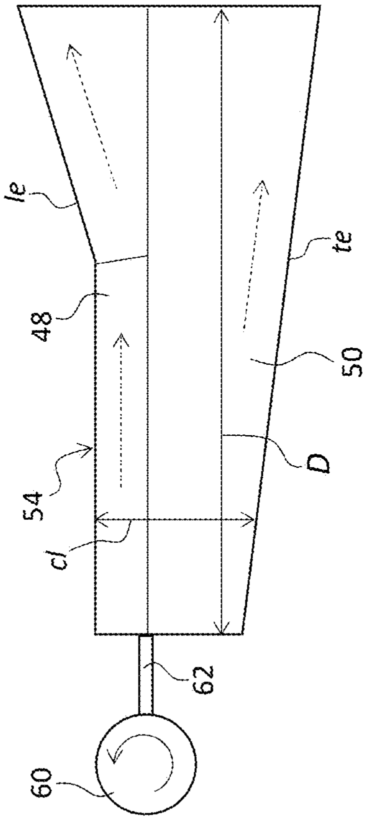
FIG. 28 is a schematic plan view of a blade of an axial fan in accordance with the invention.
Figure 31:
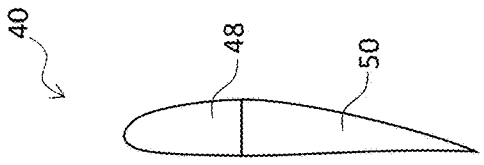
FIG. 31 is a sectional view operated along the line XXXI-XXXI of FIG. 29.
Figure 30:
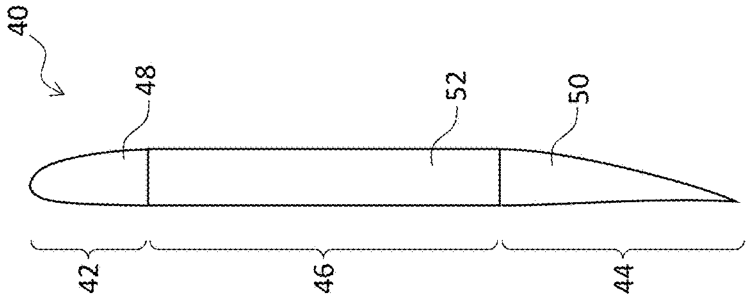
FIG. 30 is a sectional view operated along the line XXX-XXX of FIG. 29.

Note for example that, in the blade 56 of FIG. 26, the progressive advancement of the trailing edge te in the radially outer zone can be obtained through trim of the rear appendage 66 or through a different orientation with respect to the radial direction of the rear section 50 of the airfoil. These two solutions, which lead to having an identical plan shape, have different aerodynamic characteristics and therefore respond to different needs.

FIGS. 29 and 32 schematically show in plan two half-wings 58 for a fixed wing aircraft. Both half-wings 58 use an airfoil 40 similar to the one described above in relation to FIGS. 1 to 3. Both half-wings 58, although different from each other, show a decrease in the chord cl towards the distal end (tip). The decrease of the chord cl in the distal zone of the half-wing 58 improves, in a manner known per se, the distribution of the aerodynamic loads by limiting the flexural loads in the zone of the wing root.

Both half-wings 58 of FIGS. 29 and 32 may represent an oversimplified solution for an airplane, but they may be usefully employed in other aircraft, such as for example low-cost drones.

A third aspect of the invention concerns a method for defining an airfoil 40. The method of the invention comprises the steps of:

- providing a known profile 40 having a front leading edge le, a rear trailing edge te, a mean line ml and a thickness t;
- identifying in the known airfoil 40 a front portion 42 in which the thickness t increases, along the mean line ml from the leading edge le backwards, up to a maximum thickness $t_{max}$;
- identifying in the know airfoil 40 a rear portion 44 in which the thickness t increases, along the mean line ml from the trailing edge te forwards, up to the maximum thickness $t_{max}$;
- spacing apart the front portion 42 and the rear portion 44 along a direction perpendicular to the direction of maximum thickness $t_{max}$;
- interposing between the front portion 42 and the rear portion 44 a central portion 46 having constant thickness t equal to the maximum thickness $t_{max}$;
- providing a front section 48 and a rear section 50 of the profile 40, wherein the front portion 42 is defined by the front section 48 and the rear portion 44 is defined by the rear section 50; and
- assembling the front section 48 and the rear section 50 so as to obtain the profile 40.

As the person skilled in the art can well understand, the method described above may concern both the definition of a theoretical airfoil 40, for example in the design phase, and the definition of a real airfoil 40, for example in the practical manufacturing.

While remaining within the scope of the design, the method of the invention may be part of a more complex method, intended to define a fluid-dynamic surface 54. In this case the method may envisage defining at least two different airfoils 40, using for each of them the steps described above, in which the two airfoils 40 have identical maximum thickness $t_{max}$ and mean lines ml of different lengths.

The fluid-dynamic surface 54 will have two ends spaced apart by a distance D. The method preferably comprises the step of defining the distance D, for example in terms of proportions with respect to the mean lines ml of the two airfoils 40.

Within the scope of the practical manufacturing, the method of the invention comprises the further steps of providing two or more sections 48, 50, 52 of the airfoil 40. Preferably the sections 48, 50, 52 are obtained by means of extrusion/pultrusion.

For example, the method may envisage the step of providing only the front section 48 and the rear section 50 of the airfoil 40, wherein:

- the front portion 42 is defined by the front section 48; and
- the rear portion 44 is defined by the rear section 50.

In this case the central portion 46 of the airfoil 40 may be defined by the front section 48 and/or by the rear section 50.

Alternatively, the method may envisage the step of providing a front section 48, a rear section 50, and a central section 52 of the airfoil 40, wherein:

- the front portion 42 is defined by the front section 48;
- the rear portion 44 is defined by the rear section 50; and
- the central portion 46 is defined at least partially by the central section 52.

Other ancillary steps of the method of the invention can be deduced by the person skilled in the art from what has been described above in relation to the airfoil 40 and to the fluid-dynamic surface 54 of the invention. In fact, in light of the description reported above, the person skilled in the art will have no difficulty in deducing the ancillary steps of the method necessary to orient the sections 48, 50, 52 together, join the sections 48, 50, 52 together, etc.

Example

With reference to FIGS. 35 and 36, the comparison between the performance of two airfoils 40 of equal chord cl, one in accordance with the prior art (FIG. 36.*a*) and one in accordance with the invention (FIG. 36.*b*) is described below. The performances considered in the comparison are the lift (Lift), the resistance (Drag) and the efficiency, understood as the ratio between the two (Lift/Drag). The comparison concerns the application of the two airfoils 40 to a blade 56 of a ducted axial fan, for industrial use, and was performed by the Owner using computational fluid-dynamics techniques (CFD). It was chosen to simulate the two types of blade 56 in a significant stationary regime for industrial fans, testing different pitch angles.

FIG. 35 schematically shows the speed field that, in the numerical simulation, hits the fan blade 56, which assumes each time one of the two airfoils 40 in order to perform the comparison. FIG. 35 shows the axial direction a (defined by the axis of rotation), the radial direction r (defined by a half line originating from and perpendicular to the axis of rotation) and the tangential direction t (defined by a straight line normal to the radial direction and comprised in a plane perpendicular to the axis of rotation).

Each section of the blade 56 is hit by an air flow whose speed can be more easily considered if decomposed into its two components described below. A first component is the tangential component Vt, originating from the rotational movement of the blade 56. This tangential speed Vt is proportional to the angular speed of the blade 56 and the distance from the axis of rotation. It is therefore assumed that this component has a triangular distribution ranging from zero at the axis of rotation, to a maximum at the distal end.

In the CFD simulation, a constant angular speed of the blade 56 equal to 660 rpm (revolutions per minute) and a maximum tangential speed Vt at the distal end of the blade 56 equal to 60 m/s were assumed. A second component of the speed is the axial component Va, due to the axial flow of the air caused by the forces produced by the fan itself. It is assumed that this axial speed Va has a distribution similar to the one represented graphically in FIG. 35, obtained experimentally. As can be noted, this distribution comprises negative values in the radially innermost region: this phenomenon is due to the recirculation that is commonly found in that region of the fan. The axial speed Va reaches a maximum at approximately two-thirds of the blade 56, then returns to zero at the distal end. In the simulation, an axial speed Va constant over time, with a maximum value of 14 m/s was assumed.

Keeping these parameters constant, the CFD numerical simulations considered the two airfoils 40 at different pitch angles: 3°, 6°, 10.5° and 15°. The results of the different simulations are reported in the tables below.

| | 3° | | | 6° | | |
|---|---|---|---|---|---|---|
| | Lift (N) | Drag (N) | L/D | Lift (N) | Drag (N) | L/D |
| Airfoil of the prior art | 138.3 | 40.23 | 3.45 | 191.27 | 55.5 | 3.44 |
| Airfoil of the invention | 136.44 | 38.67 | 3.53 | 188.63 | 54.58 | 3.46 |

| | 10.5° | | | 15° | | |
|---|---|---|---|---|---|---|
| | Lift (N) | Drag (N) | L/D | Lift (N) | Drag (N) | L/D |
| Airfoil of the prior art | 265.68 | 83.14 | 3.19 | 329.16 | 114.75 | 2.87 |
| Airfoil of the invention | 246.48 | 77.11 | 3.16 | 310.66 | 108.5 | 2.85 |

Before carrying out the simulation, the Owner expected the performance of the airfoil 40 of the prior art to always be in any case better than that of the invention, which introduces a drastic construction simplification. The simulation was therefore intended to assess the extent of the loss in performance and, consequently, how much the simplification of the manufacturing of the airfoils 40 could be profitable against the loss of performance.

Contrary to expectations, as can be noted in the tables reported above, the performances of the two airfoils 40 differ little and in some cases the airfoil 40 of the invention even obtains the best performances. In particular, the airfoil 40 of the invention shows a better efficiency for the smaller pitch angles (3° and) 6°, while for the larger pitch angles (10.5° and) 15° it shows a lower efficiency by a few hundredths point.

In order to give an interpretation of the results obtained, the Owner makes the following assumptions. It is likely that at the smaller pitch angles (3° and) 6°, where the flow more easily follows the airfoil 40, the shape of the airfoil 40 of the invention obtains better performances mainly thanks to the lower maximum thickness and therefore to the lower shape resistance (see FIG. 36.*b*). On the other hand, at the greater pitch angles (10.5° and) 15°, the thicker and rounder shape of the airfoil 40 of the prior art (see FIG. 36.*a*) would help the flow to follow it more, especially on the back.

In light of what is reported above, the person skilled in the art can well understand how the invention overcomes the drawbacks highlighted in relation to the prior art.

In particular, the present invention provides an airfoil whose extension in the direction of the chord can be varied in a simple and economical way in order to adapt it to different needs.

Furthermore, the present invention provides an airfoil which, despite the simplicity of manufacturing, maintains performances comparable or even better than those of the known airfoils.

Still, the present invention provides a fluid-dynamic surface whose proportions can be varied in a simple and economical way in order to adapt it to different needs.

Finally, the present invention provides a method for defining an airfoil 40 in a simple and economical way in order to adapt it to different needs.

In conclusion, all the details can be replaced by other technically equivalent elements; the characteristics described in relation to a specific embodiment can also be used in the other embodiments; the materials used, as well as the contingent shapes and dimensions, can be any according to the specific implementation needs without leaving the scope of protection of the following claims.

The invention claimed is:

1. An airfoil comprising: a leading edge, a trailing edge, a mean line and a thickness,
- a front portion in which the thickness increases, along the mean line from the leading edge towards the trailing edge, up to a maximum thickness; and
- a rear portion in which the thickness increases, along the mean line from the trailing edge towards the leading edge, up to the maximum thickness;
- a central portion, placed between the front portion and the rear portion, in which the thickness is constant and equal to the maximum thickness;
- and at least one front section and rear section, wherein:
- the front portion is defined by the front section;
- the rear portion is defined by the rear section; and
- the front section and the rear section are separate parts, and the airfoil is obtained by assembling at least the front section and the rear section utilizing one or more of: riveting, bolting, a joining element, and male/female interfaces.

2. The airfoil according to claim 1, wherein the front section and the rear section are obtained by extrusion/pultrusion.

3. The airfoil according to claim 1, wherein the central portion is defined by the front section and/or by the rear section.

4. The airfoil according to claim 1, further comprising a central section.

5. The airfoil according to claim 4, wherein the central section is obtained by extrusion/pultrusion.

6. The airfoil according to claim 1, further comprising a back and a belly, and wherein the back and/or the belly and/or the mean line are continuous and uniform.

7. A fluid-dynamic surface comprising two ends, spaced apart by a distance, and at least two airfoils according to claim 1, wherein the two airfoils have identical maximum thickness and mean lines of different lengths.

8. The fluid-dynamic surface according to claim 7, wherein the two airfoils have identical front portions and rear portions and different central portions.

9. The fluid-dynamic surface according to claim 7, wherein an extension of the central portions, in a direction perpendicular to the maximum thickness, varies with continuity at least along a segment between the two ends.

10. The fluid-dynamic surface according to claim 7, wherein the fluid-dynamic surface is a half-wing.

11. The fluid-dynamic surface according to claim 7, wherein the fluid-dynamic surface is a blade of a rotor.

12. A method for defining the airfoil of claim 1, comprising the steps of:

providing the airfoil having the leading edge, the trailing edge, the mean line, and the thickness;

identifying in the airfoil the front portion in which the thickness increases, along the mean line from the leading edge towards the trailing edge, up to a maximum thickness;

identifying in the airfoil the rear portion in which the thickness increases, along the mean line from the trailing edge towards the leading edge, up to the maximum thickness;

spacing apart the front portion and the rear portion along a direction perpendicular to the direction of maximum thickness;

interposing between the front portion and the rear portion the central portion having constant thickness equal to the maximum thickness;

providing the front section and the rear section of the airfoil, wherein the front portion is defined by the front section and the rear portion is defined by the rear section; and assembling the front section and the rear section so as to obtain the airfoil.

13. The method according to claim 12, wherein the front section and the rear section are obtained by extrusion/pultrusion.

14. The airfoil according to claim 4, wherein the front section, the central section, and the rear section are produced as separate parts, and the airfoil is obtained by assembling at least the front section, the central section, and the rear section.

* * * * *